US012585316B1

(12) United States Patent
Pham et al.

(10) Patent No.: US 12,585,316 B1
(45) Date of Patent: Mar. 24, 2026

(54) SITE-BASED CONTROL

(71) Applicant: Auradine, Inc., Santa Clara, CA (US)

(72) Inventors: Diana Pham, Santa Clara, CA (US);
Marshall Long, Sugarland, TX (US);
Matangi Vaidyanathan, Santa Clara,
CA (US); **Sairam Jalakam
Devarajulu**, Santa Clara, CA (US);
Sridhar Chirravuri, Sunnyvale, CA
(US)

(73) Assignee: Auradine, Inc., Santa Clara, CA (US)

( * ) Notice: Subject to any disclaimer, the term of this
patent is extended or adjusted under 35
U.S.C. 154(b) by 0 days.

(21) Appl. No.: 19/187,313

(22) Filed: Apr. 23, 2025

(51) Int. Cl.
| | |
|---|---|
| *G06F 1/26* | (2006.01) |
| *G05B 13/02* | (2006.01) |
| *G06F 1/3203* | (2019.01) |
| *G06F 1/3206* | (2019.01) |
| *G06F 1/324* | (2019.01) |
| *G06F 1/3296* | (2019.01) |

(52) U.S. Cl.
CPC ............. *G06F 1/26* (2013.01); *G05B 13/024*
(2013.01); *G06F 1/3203* (2013.01); *G06F
1/3206* (2013.01); *G06F 1/324* (2013.01);
*G06F 1/3296* (2013.01)

(58) Field of Classification Search
CPC .......... G06F 1/3203; G06F 1/26; G06F 1/324;
G06F 1/3296; G06F 1/3206; G05B
13/024
USPC .................... 713/300, 310, 322, 323; 700/32
See application file for complete search history.

(56) References Cited

U.S. PATENT DOCUMENTS

| | | | |
|---|---|---|---|
| 8,762,752 B2 * | 6/2014 | Inbaraj .................. | G06F 1/3206 |
| | | | 713/320 |
| 9,250,684 B1 * | 2/2016 | Chen ..................... | G06F 1/3206 |
| 10,433,035 B2 | 10/2019 | Chayat | |
| 12,081,624 B1 | 9/2024 | Xu et al. | |
| 12,243,827 B1 | 3/2025 | Liu et al. | |
| 12,314,764 B1 | 5/2025 | Long et al. | |
| 12,341,514 B1 | 6/2025 | Ilislamoo et al. | |
| 12,392,670 B1 | 8/2025 | Zhou et al. | |
| 2002/0116532 A1 | 8/2002 | Berg | |
| 2018/0288152 A1 * | 10/2018 | Chagam Reddy .... | G06F 3/0635 |

(Continued)

OTHER PUBLICATIONS

Foreman.mn [online], "Automation," retrieved on May 5, 2025,
retrieved from URL <https://foreman.mn/features/automation/>, 5
pages.

(Continued)

*Primary Examiner* — Ji H Bae
(74) *Attorney, Agent, or Firm* — Fish & Richardson P.C.

(57) ABSTRACT

A method includes: obtaining a site-specific power plan for
a first site, wherein the first site includes a plurality of
computing devices that are configured to receive power
through a common grid-facing meter; obtaining a first
group-specific objective for a first group of computing
devices of the plurality of computing devices, and obtaining
a second group-specific objective for a second group of
computing devices of the plurality of computing devices;
determining computational parameters of the plurality of
computing devices based on the first group-specific objec-
tive and the second group-specific objective, subject to one
or more constraints corresponding to the site-specific power
plan; and controlling the plurality of computing devices to
perform the common type of computation using the deter-
mined computational parameters.

23 Claims, 20 Drawing Sheets

(56)       References Cited

U.S. PATENT DOCUMENTS

| | | | |
|---|---|---|---|
| 2018/0302498 A1 * | 10/2018 | Xie | G06N 5/022 |
| 2020/0042068 A1 * | 2/2020 | Rong | G06F 1/3203 |
| 2021/0004035 A1 * | 1/2021 | Yang | H02J 3/14 |
| 2021/0405728 A1 * | 12/2021 | Jain | H05K 7/1487 |
| 2022/0300524 A1 | 9/2022 | Banerjee et al. | |
| 2025/0238070 A1 * | 7/2025 | Mukherjee | G06F 1/3296 |

OTHER PUBLICATIONS

Foreman.mn [online], "Inventory Management," retrieved on May 5, 2025, retrieved from URL <https://foreman.mn/features/inventory/ >, 4 pages.
Foreman.mn [online], "Mine Management Software," retrieved on May 5, 2025, retrieved from URL <https://foreman.mn/>, 11 pages.
Foreman.mn [online], "Power Control," retrieved on May 5, 2025, retrieved from URL <https://foreman.mn/features/powercontrol/>, 3 pages.
Foreman.mn [online], "Site Map," retrieved on May 5, 2025, retrieved from URL <https://foreman.mn/features/sitemap/>, 6 pages.

* cited by examiner

Report
800

802

804

808

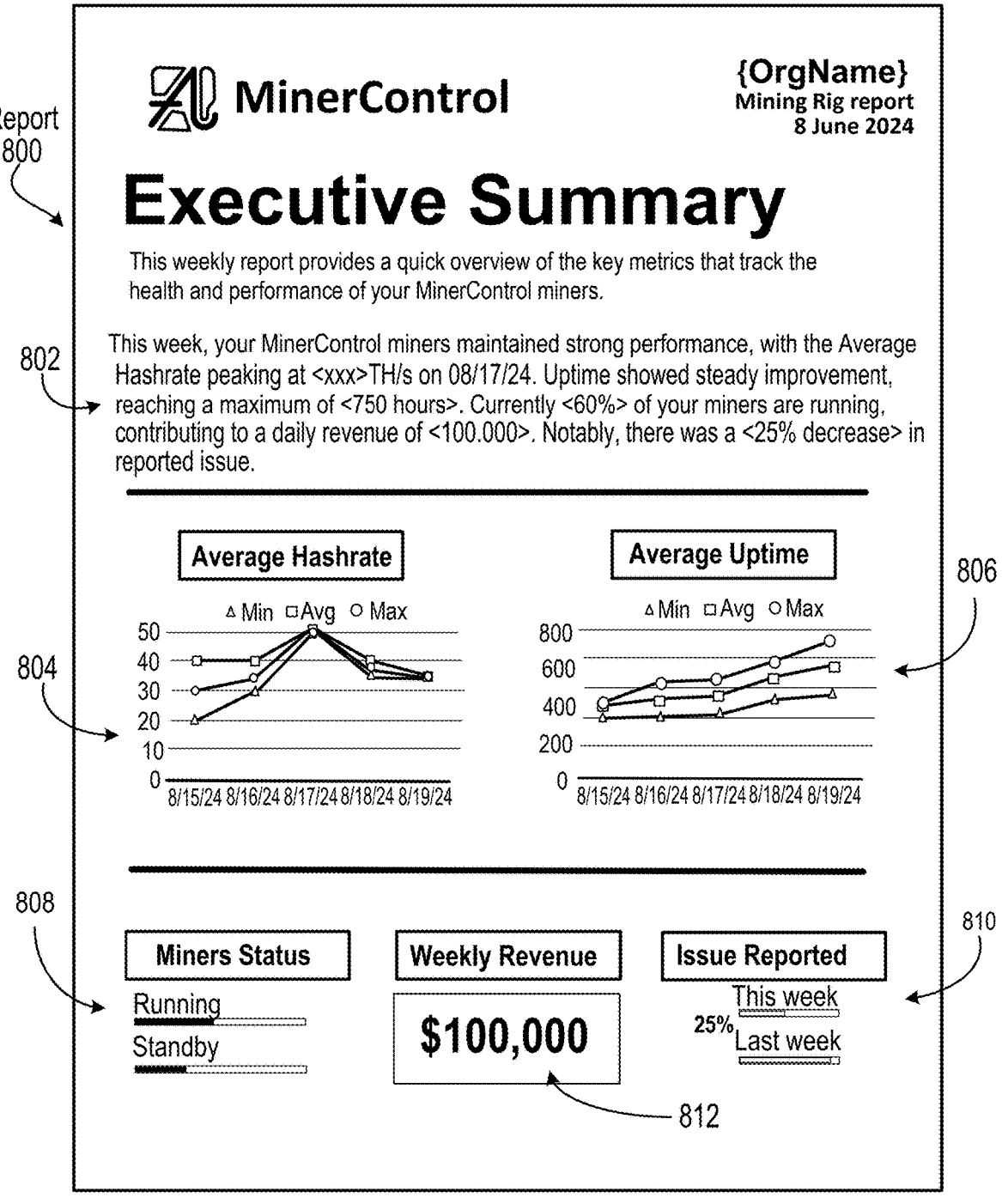

{OrgName}
Mining Rig report
8 June 2024

MinerControl

Executive Summary

This weekly report provides a quick overview of the key metrics that track the health and performance of your MinerControl miners.

This week, your MinerControl miners maintained strong performance, with the Average Hashrate peaking at <xxx>TH/s on 08/17/24. Uptime showed steady improvement, reaching a maximum of <750 hours>. Currently <60%> of your miners are running, contributing to a daily revenue of <100.000>. Notably, there was a <25% decrease> in reported issue.

User interface 900

Miner Inventory
Manage your miners individually or by organizing them into groups based on sites or other criteria.

All minors

Move | Tag

| | IP Address | Mode | Model | Power Efficiency | Uptime | Hash rate |
|---|---|---|---|---|---|---|
| ▶ | 10.30.2.18 | custom | AT1500 | 17.010219128050056 J/ 1h 40m | | 39.21 TH/s |
| ▶ | 192.168.20.117 | custom | AT1500 | 23.705657452662198 J/T 24h 4m | | 105.71 TH/s |
| ▶ | 10.30.2.21 | custom | AI3680 | 38.36364773351163 J/ 1h 33m | | 155.15 TH/s |
| ▶ | 192.168.20.126 | custom | AT1500 | 25.44 J/THs | 5h 49m | 35.12 TH/s |
| ▶ | 192.168.20.133 | custom | AT1500 | 23.86 J/THs | 145h 49m | 153.12 TH/s |
| ▶ | 192.168.0.48 | | AR-10 | | 3h 1m | |
| ▶ | 10.30.2.103 | custom | AT2880 | 0.09 J/THs | | 65.35 TH/s |
| ▶ | 10.30.2.27 | custom | AT1500 | 25.95 J/THs | 27h 41m | 149.85 TH/s |

Figure 11:
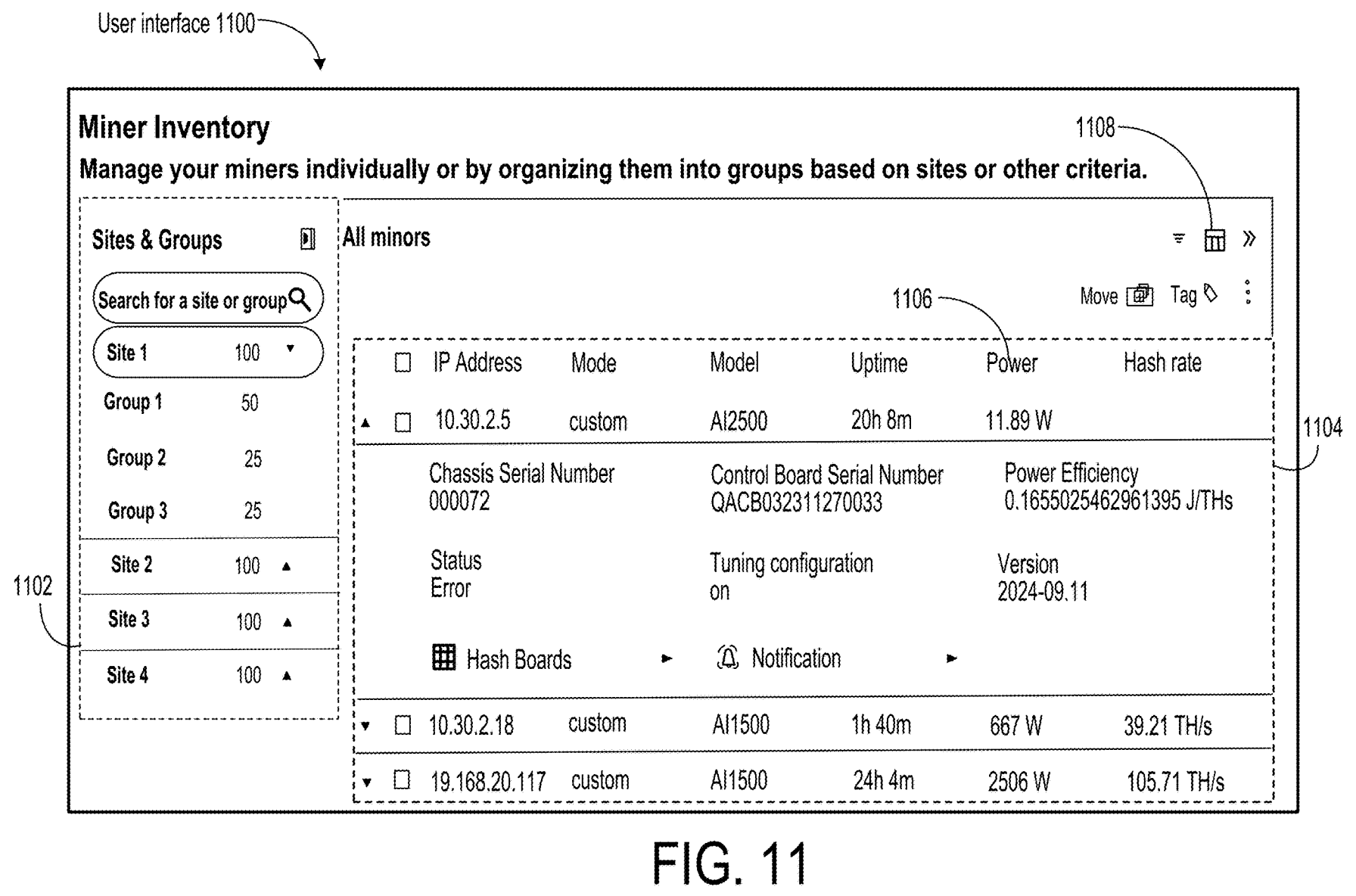

User interface 1100

Miner Inventory

Manage your miners individually or by organizing them into groups based on sites or other criteria.

1108

1106

1104

1102

| Sites & Groups | | All minors | | | Move | Tag |
|---|---|---|---|---|---|---|
| Search for a site or group 🔍 | | ☐ IP Address | Mode | Model | Uptime | Power | Hash rate |
| Site 1 | 100 ▶ | ☐ 10.30.2.5 | custom | AI2500 | 20h 8m | 11.89 W | |
| Group 1 | 50 | | | Chassis Serial Number | Control Board Serial Number | Power Efficiency | |
| Group 2 | 25 | | | 000072 | QACB032311270033 | 0.165502546296139 5 J/THs | |
| Group 3 | 25 | | | Status | Tuning configuration | Version | |
| Site 2 | 100 ◀ | | | Error | on | 2024-09.11 | |
| Site 3 | 100 ◀ | | | ⊞ Hash Boards | △ Notification | ▲ | |
| Site 4 | 100 ◀ | ▶ ☐ 10.30.2.18 | custom | AI1500 | 1h 40m | 667 W | 39.21 TH/s |
| | | ▶ ☐ 19.168.20.117 | custom | AI1500 | 24h 4m | 2506 W | 105.71 TH/s |

Receive, at an asset management server, status data pushed from a plurality of computing devices that are remote from the asset management server.
1702

Generate, by the asset management server, a report based on the status data
1704

Send, by the asset management server, the report to a user device.
1706

1800

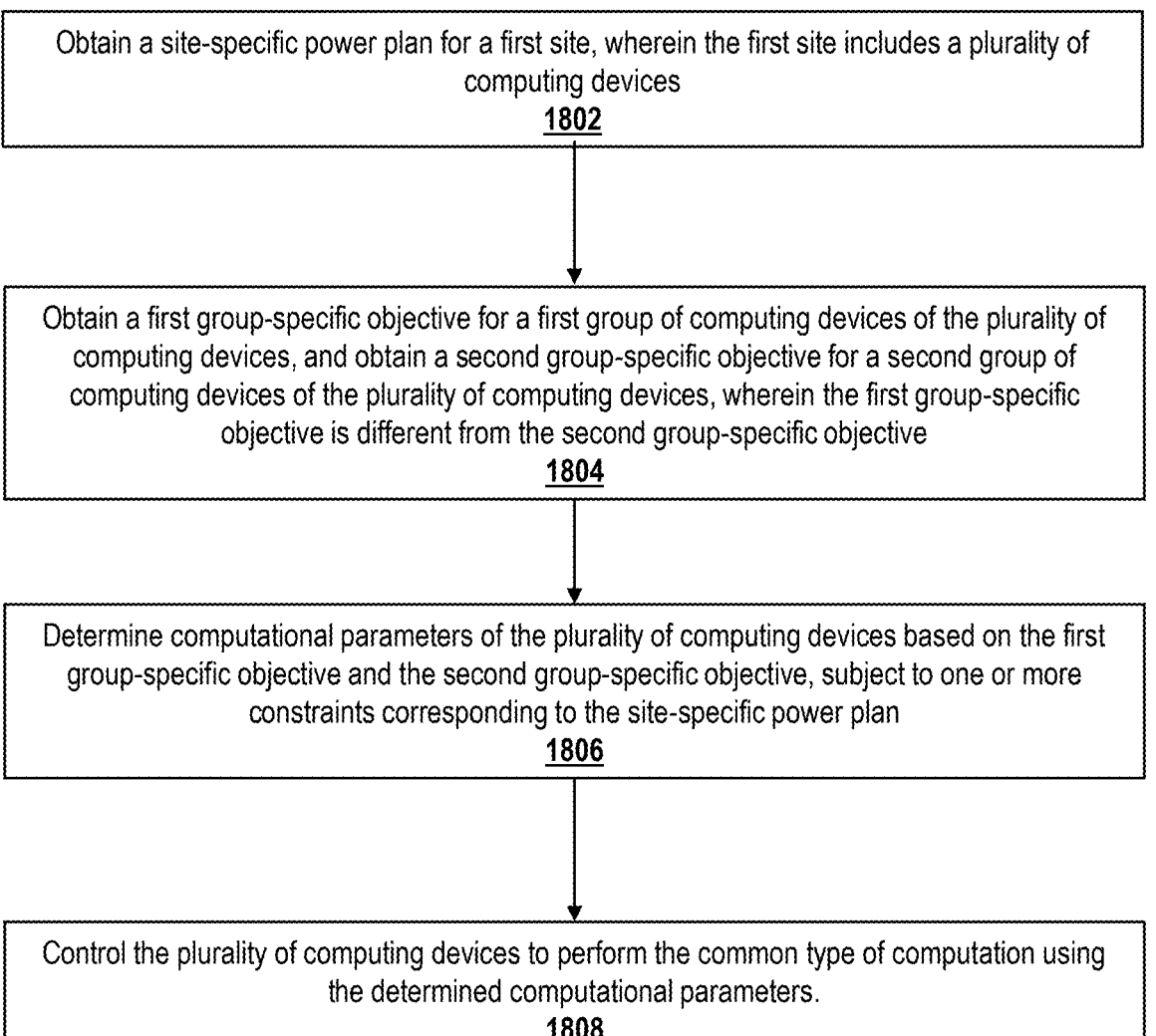

Obtain a site-specific power plan for a first site, wherein the first site includes a plurality of computing devices
1802

Obtain a first group-specific objective for a first group of computing devices of the plurality of computing devices, and obtain a second group-specific objective for a second group of computing devices of the plurality of computing devices, wherein the first group-specific objective is different from the second group-specific objective
1804

Determine computational parameters of the plurality of computing devices based on the first group-specific objective and the second group-specific objective, subject to one or more constraints corresponding to the site-specific power plan
1806

Control the plurality of computing devices to perform the common type of computation using the determined computational parameters.
1808

FIG. 18

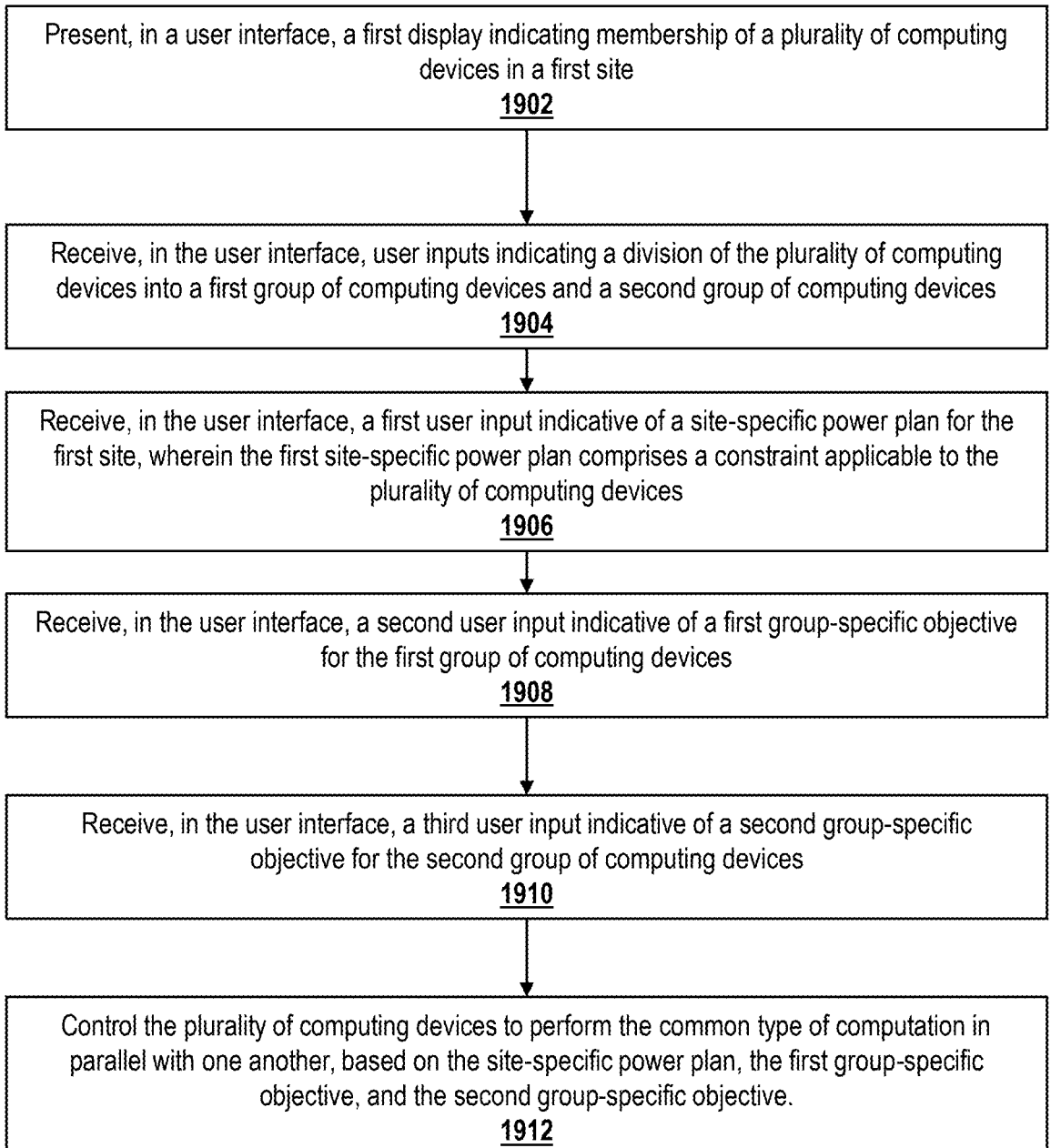

1900

Present, in a user interface, a first display indicating membership of a plurality of computing devices in a first site
1902

Receive, in the user interface, user inputs indicating a division of the plurality of computing devices into a first group of computing devices and a second group of computing devices
1904

Receive, in the user interface, a first user input indicative of a site-specific power plan for the first site, wherein the first site-specific power plan comprises a constraint applicable to the plurality of computing devices
1906

Receive, in the user interface, a second user input indicative of a first group-specific objective for the first group of computing devices
1908

Receive, in the user interface, a third user input indicative of a second group-specific objective for the second group of computing devices
1910

Control the plurality of computing devices to perform the common type of computation in parallel with one another, based on the site-specific power plan, the first group-specific objective, and the second group-specific objective.
1912

FIG. 19

SITE-BASED CONTROL

FIELD OF THE DISCLOSURE

This specification generally relates to control of computing devices that include multiple integrated circuit (IC) chips.

BACKGROUND

A large number of hardware assets (e.g., computers that perform computation tasks for cryptographic operations, such as mining cryptocurrencies, or for large language models, among other applications) can be aggregated together and managed in a common system.

SUMMARY

Some aspects of this disclosure describe a computing device. The computing device includes: a plurality of integrated circuit (IC) chips arranged on one or more substrates; and a controller. The controller is configured to: control the plurality of integrated circuit (IC) chips to perform a common type of computation in parallel with one another; receive, from one or more of the plurality of IC chips, IC chip data indicative of performance of the IC chips; generate status data based on the IC chip data; and push the status data to a remote asset management server.

This and other computing devices described herein can have one or more of at least the following characteristics.

In some implementations, the controller is configured to generate the status data by adjusting the IC chip data, and pushing the status data includes pushing the status data in adjusted form.

In some implementations, the status data in adjusted form includes multiple types of status data in a single compressed data file.

In some implementations, the controller is configured to: obtain, from the remote asset management server, a reporting parameter; store the reporting parameter locally at the controller; and push the status data to the remote asset management server based on the reporting parameter.

In some implementations, the reporting parameter includes a reporting interval.

In some implementations, the controller is configured to push the status data without receiving a corresponding query from the remote asset management server.

In some implementations, the status data includes at least one of: a temperature, a power mode of the plurality of IC chips, or a computation rate of the plurality of IC chips.

In some implementations, the common type of computation includes a hash computation or a machine learning computation.

In some implementations, the controller is on the substrate.

Some aspects of this disclosure describe a method. The method includes:

receiving, at an asset management server, status data pushed from a plurality of computing devices that are remote from the asset management server, wherein each of the plurality of computing devices includes a plurality of IC chips configured to perform a common type of computation in parallel with one another; generating, by the asset management server, a report based on the status data; and sending, by the asset management server, the report to a user device.

This and other methods described herein can have one or more of at least the following characteristics.

In some implementations, the method includes receiving the status data in a compressed form.

In some implementations, the status data in the compressed form includes multiple types of status data in a single compressed data file.

In some implementations, the method includes: providing a reporting parameter from the asset management server to the plurality of computing devices, to cause the plurality of computing devices to push the status data to the asset management server in accordance with the reporting parameter.

In some implementations, the reporting parameter includes a reporting interval.

In some implementations, the method includes receiving the status data at the asset management server without sending a corresponding query from the asset management server to the plurality of computing devices.

In some implementations, the status data includes at least one of: a temperature, a power mode of the plurality of computing devices, or a computation rate of the plurality of computing devices.

In some implementations, the report has a PDF format.

In some implementations, the report has a coloration compliant with Web Content Accessibility Guidelines (WCAG).

In some implementations, the method includes sending computational parameters from the asset management server to the plurality of computing devices to cause the plurality of computing devices to perform the common type of computation in accordance with the computational parameters.

In some implementations, the method includes: storing, by the asset management server, the status data in a telemetry database; and retrieving, by the asset management server, the status data from the telemetry database.

Some aspects of this disclosure describe another method. The method includes: obtaining a site-specific power plan for a first site. The first site includes a plurality of computing devices. Each of the plurality of computing devices includes a plurality of integrated circuit (IC) chips configured to perform a common type of computation in parallel with one another. The plurality of computing devices are configured to receive power through a common grid-facing meter. The plurality of computing devices are distinct from a second plurality of computing devices. The second plurality of computing devices are assigned to a second site based on the second plurality of computing devices being configured to receive power through a common second grid-facing meter. The method includes: obtaining a first group-specific objective for a first group of computing devices of the plurality of computing devices, and obtaining a second group-specific objective for a second group of computing devices of the plurality of computing devices. The first group-specific objective is different from the second group-specific objective. The method includes determining computational parameters of the plurality of computing devices based on the first group-specific objective and the second group-specific objective, subject to one or more constraints corresponding to the site-specific power plan. A computational parameter of the first group of computing devices is different from a corresponding computational parameter of the second group of computing devices. The method includes controlling the plurality of computing devices to perform the common type of computation using the determined computational parameters.

This and other methods described herein can have one or more of at least the following characteristics.

In some implementations, the site-specific power plan specifies a target range of a rate of change of total power consumption by the plurality of computing devices, and the computational parameters are determined subject to the target range.

In some implementations, the site-specific power plan specifies at least one of a maximum total power consumption by the plurality of computing devices or a minimum total power consumption by the plurality of computing devices. The computational parameters are determined subject to the at least one of the maximum total power consumption or the minimum total power consumption.

In some implementations, the computational parameters include a power mode.

In some implementations, the computational parameters include at least one of a supply voltage or a clock frequency.

In some implementations, the method includes determining the site-specific power plan based on real-time data characterizing an electrical grid from which the common grid-facing meter receives electricity.

In some implementations, the method includes: receiving an instruction from a utility provider or a regulator, the instruction indicating at least one of a maximum total power consumption by the plurality of computing devices, a minimum total power consumption by the plurality of computing devices, or a maximum rate of increase in total power consumption by the plurality of computing devices; in response to the instruction, determining a new site-specific power plan for the first site; and determining new computational parameters of the plurality of computing devices based on the first group-specific objective and the second group-specific objective, subject to constraint by the new site-specific power plan.

In some implementations, controlling the plurality of computing devices includes: determining to switch the plurality of computing devices from a first state in which the plurality of devices do not perform the common type of computation to a second state in which the plurality of devices perform the common type of computation; determining at least one of an order or a timing with which to switch the plurality computing devices from the first state to the second state based on the first group-specific objective and the second group-specific objective, subject to constraint by the site-specific power plan; and causing the plurality of devices to switch from the first state to the second state in accordance with the at least one of the order or the timing.

In some implementations, the computational parameters result in a power consumption of the first group of computing devices changing at a first rate that is different from a second rate with which a power consumption of the second group of computing devices changes. A difference between the first rate and a second rate is based on a difference between a first weighting of computation rate in the first group-specific objective and a second weighting of computation rate in the second group-specific objective.

In some implementations, the common type of computation includes a hash computation or a machine learning computation.

Some aspects of this disclosure describe a system that includes a plurality of computing devices assigned to a first site, wherein each of the plurality of computing devices includes a plurality of integrated circuit (IC) chips configured to perform a common type of computation in parallel with one another, wherein the plurality of computing devices are configured to receive power through a common grid-facing meter, and wherein the plurality of computing devices are distinct from a second plurality of computing devices. The second plurality of computing devices are assigned to a second site based on the second plurality of computing devices being configured to receive power through a common second grid-facing meter. The system includes an asset management server that is remote from the plurality of computing devices and communicatively connected to the plurality of computing devices. The asset management server is configured to: obtain a site-specific power plan for the first site; obtain a first group-specific objective for a first group of computing devices of the plurality of computing devices, and obtain a second group-specific objective for a second group of computing devices of the plurality of computing devices, wherein the first group-specific objective is different from the second group-specific objective; determine computational parameters of the plurality of computing devices based on the first group-specific objective and the second group-specific objective, subject to constraint by the site-specific power plan, wherein a computational parameter of the first group of computing devices is different from a corresponding computational parameter of the second group of computing devices; and control the plurality of computing devices to perform the common type of computation using the determined computational parameters.

This and other systems described herein can have one or more of at least the following characteristics.

In some implementations, the site-specific power plan specifies a target range of a rate of change of total power consumption by the plurality of computing devices, and the computational parameters are determined subject to the target range.

In some implementations, the asset management server is configured to: receive an instruction from a utility provider or a regulator, the instruction indicating at least one of a maximum total power consumption by the plurality of computing devices, a minimum total power consumption by the plurality of computing devices, or a maximum rate of increase in total power consumption by the plurality of computing devices; in response to the instruction, determine a new site-specific power plan for the first site; and determine new computational parameters of the plurality of computing devices based on the first group-specific objective and the second group-specific objective, subject to constraint by the new site-specific power plan Some aspects of this disclosure describe another method. The method includes: presenting, in a user interface, a first display indicating membership of a plurality of computing devices in a first site. Each of the plurality of computing devices includes a plurality of integrated circuit (IC) chips configured to perform a common type of computation in parallel with one another. The plurality of computing devices of the first site are configured to receive power through a common grid-facing meter, and the plurality of computing devices are distinct from a second plurality of computing devices, assigned to a second site, based on the second plurality of computing devices being configured to receive power through a common second grid-facing meter. The method includes receiving, in the user interface, user inputs indicating a division of the plurality of computing devices into a first group of computing devices and a second group of computing devices; receiving, in the user interface, a first user input indicative of a site-specific power plan for the first site, wherein the first site-specific power plan includes a constraint applicable to the plurality of computing devices; receiving, in the user interface, a second user input indicative of a first group-specific objective for the first group of computing devices; receiving, in the user interface, a third user input indicative of a second group-specific objective for the second group of computing devices, wherein the first group-specific objective is different from the second group-specific objective; and controlling the plurality of computing devices to perform the common type of computation in parallel with one another, based on the site-specific power plan, the first group-specific objective, and the second group-specific objective.

This and other methods described herein can have one or more of at least the following characteristics.

In some implementations, the method includes receiving, through the user interface, a fourth user input indicating that a first computing device is re-assigned from the first group to the second group; and based on the re-assignment, determining updated computational parameters based on which the plurality of computing devices are controlled.

In some implementations, the first user input indicates a utility provider or a regulator with which the first site is associated, and the method includes: receiving dynamic data from the utility provider or the regulator; determining, based on the dynamic data, an updated constraint including at least one of: a maximum total power consumption by the plurality of computing devices, a minimum total power consumption by the plurality of computing devices, or a maximum rate of increase in total power consumption by the plurality of computing devices; and controlling the plurality of computing devices subject to the updated constraint.

In some implementations, the second input includes a function to be optimized for the first group-specific objective, and controlling the plurality of computing devices includes controlling the first group of computing devices based on optimization of the function.

In some implementations, the site-specific power plan specifies a target range of a rate of change of total power consumption by the plurality of computing devices, and controlling the plurality of computing devices includes controlling the plurality of computing devices subject to the target range.

In some implementations, controlling the plurality of computing devices includes configuring at least one of a power mode, a supply voltage, or a clock frequency of the plurality of computing devices.

In some implementations, the common type of computation includes a hash computation or a machine learning computation.

Some aspects of this disclosure describe another method. The method includes: receiving, at an asset management server, status data from a plurality of computing devices that are remote from the asset management server. Each of the plurality of computing devices includes a plurality of IC chips configured to perform a common type of computation in parallel with one another. The status data includes at least one of a computation rate, a power consumption, or a computation efficiency. The method includes storing, by the asset management server, the status data in a telemetry database receiving, at the asset management server, a first request from a user device; in response to the first request, obtaining, by the asset management server from the telemetry database, a first subset of the status data, and providing the first subset of the status data to the user device; receiving, at the asset management server, a second request from the user device; and, in response to the second request, obtaining, by the asset management server from the telemetry database, a second subset of the status data that includes status data not included in the first subset of the status data, and providing the second subset of the status data to the user device.

This and other methods described herein can have one or more of at least the following characteristics.

In some implementations, the first subset of the status data is limited to status data for a first subset of the plurality of computing devices, and the second subset of the status data includes status data for at least one computing device of the plurality of computing devices that is not included in the first subset of the plurality of computing devices.

In some implementations, the first subset of the status data and the second subset of the status data are presented in a table in a user interface of the user device. Different computing devices of the plurality of computing devices correspond to different rows of the table. The first subset of the plurality of computing devices and the second subset of the plurality of computing devices correspond to respective sets of rows that are displayed at different times.

In some implementations, the first subset of the plurality of computing devices and the second subset of the plurality of computing devices are associated, respectively, with a first group-specific objective for the common type of computation and a second group-specific objective for the common type of computation. The first group-specific objective is different from the second group-specific objective, and the method includes controlling the plurality of computing devices to perform the common type of computation based on the first and second group-specific objectives.

In some implementations, the first subset of the plurality of computing devices and the second subset of the plurality of computing devices are associated, respectively, with a first site-specific power plan and a second site-specific power plan. The first site-specific power plan and the second site-specific power plan include respective different maxima of rate of increase in power consumption by the first subset of the plurality of computing devices and the second subset of the plurality of computing devices. The first site-specific power plan is different from the second site-specific power plan. The method includes controlling the plurality of computing devices to perform the common type of computation based on the first and second group-specific objectives.

In some implementations, the first subset of the status data is limited to a first subset of types of status data, from among a plurality of types of the status data, and the second subset of the status data includes at least one type of status data that is not include in the first subset of types of status data.

In some implementations, the first subset of types of status data includes at least one of the computation rate or the power consumption.

In some implementations, the first subset of the status data and the second subset of the status data are presented in a table in a user interface of the user device. Different computing devices of the plurality of computing devices correspond to different rows of the table, and the second request is triggered by a user selection of a row of the table.

In some implementations, the method includes receiving, at the asset management server, a request to alter which one or more types of status data are included in the first subset of types of status data.

In some implementations, the method includes controlling the plurality of computing devices to perform the common type of computation based on instructions received at the asset management server from the user device.

In some implementations, the common type of computation includes a hash computation or a machine learning computation.

The foregoing method can be performed, for example, by an asset management server that includes: one or more processors; and one or more non-transitory, computer-readable storage media storing instructions that, when executed by the one or more processors, cause the one or more processors to perform the method.

BRIEF DESCRIPTION OF THE DRAWINGS

FIG. 8 is an example of a status data report.

FIG. 9 is an example of a user interface presented based on a subset of status data.

FIG. 11 is an example of a user interface reflecting how status data may be requested and presented

FIGS. 17 to 20 are flowcharts illustrating examples of processes.

DETAILED DESCRIPTION

Distributed computing tasks, such as cryptocurrency mining or parallel computations for artificial intelligence (AI) tasks, may rely on control and management of large numbers of computing devices, each of which may itself include multiple independently-operating integrated circuit (IC) chips. Collecting and presenting the large amounts of data that may be generated during these tasks presents technical challenges. Performance of the computing tasks may consume a large amount of electricity and may, absent specific control, violate electrical grid regulations or otherwise impair grid operation. Further, performance may be improved when computing devices can be controlled based on different priorities or limits, and when users can easily change configurations for groups of computing devices.

Implementations according to this disclosure provide improved control processes, data handling/processing, and configuration of computing devices, characteristics which can collectively or individually improve the operation of distributed computing systems.

Figure 1:
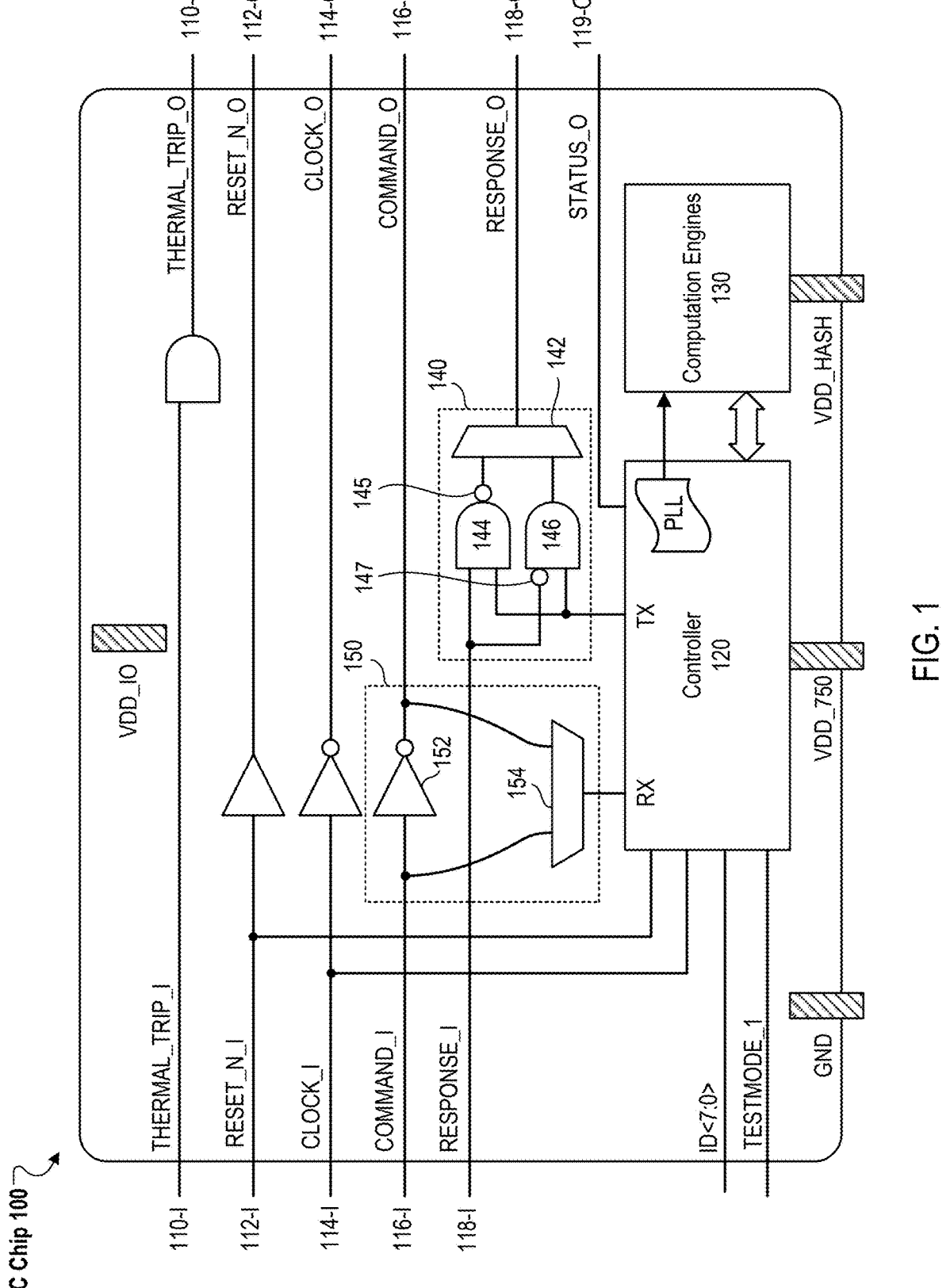
FIG. 1 is a diagram illustrating an example of an IC chip.

FIG. 1 shows a schematic diagram of an example of an integrated circuit (IC) chip 100. The IC chip 100 can be, for example, an application-specific integrated circuit (A SIC).

The IC chip 100 can be of any one or more suitable types in various implementations, such as a general-purpose processor chip, a field-programmable gate array (FPGA) chip, a neural processing unit (NPU), etc.

As shown, IC chip 100 includes multiple pairs of input and output terminals coupled to multiple buses. For example, IC chip 100 includes input terminal 118-1 and output terminal 118-0 coupled to a response (RSP) bus, input terminal 116-1 and output terminal 116-0 coupled to a command (CMD) bus, input terminal 114-1 and output terminal 114-0 coupled to a clock (CLK) bus, input terminal 112-1 and output terminal 112-O coupled to a reset (RSTN) bus, and input terminal 110-1 and output terminal 110-O coupled to a thermal trip (TMTP) bus.

IC chip 100 further includes a circuit 140 for processing signals on the response bus 118. Circuit 140 is configured to receive an input signal at input terminal 118-I on the response bus 118, combine the input signal with a signal sent by controller 120 to generate a combined signal, and transmit the combined signal on the response bus 118 by using output terminal 118-0. Based on this configuration, multiple of the IC chips 100 can be connected in series to one another to transfer their outputs together as a combined output.

In the shown example, circuit 140 includes a multiplexer 142, two AND gates 144 and 146, and two inverters 145 and 147. Multiplexer 142 is a circuit or a device that can be used to select one out of several input signals based on a control signal and route the selected input signal to an output. Each one of AND gates 144 and 146 is a circuit or a device that performs a logical conjunction operation. Each one of inverters 145 and 147 is a circuit or a device that performs a logical operation on its input signal and produces the logical complement (inverse) of the input at its output. As shown, an input terminal of inverter 145 is coupled to an output terminal of AND gate 144, and an output terminal of inverter 145 is coupled to an input terminal of multiplexer 142. An input terminal of AND gate 146 is coupled to an output terminal of inverter 147, and an output terminal of AND gate 146 is coupled to an input terminal of multiplexer 142.

In the shown example, multiplexer 142 can be configured to select, based on a control signal, one of two input signals including a first input signal that is received as an output signal of inverter 145 and a second input signal that is received as an output signal of AND gate 146, and transmit the selected input signal on the response bus 118.

IC chip 100 further includes a circuit 150 for processing signals on the command bus 116. Circuit 150 is configured to receive an input signal on the command bus 116 using input terminal 116-1, invert the input signal to generate an inverted signal, and transmit the inverted signal as an output signal on the command bus 116 using output terminal 116-0. In some implementations, circuit 150 is further configured to conditionally forward the input signal or the inverted signal to controller 120 based on a control signal received by circuit 150.

In the shown example, circuit 150 includes an inverter 152 and a multiplexer 154. An input terminal of inverter 152 is coupled to input terminal 116-1 on the command bus 116, and an output terminal of inverter 152 is coupled to output terminal 116-0 on the command bus 116. Furthermore, the input terminal of inverter 152 is further coupled to a first input terminal of multiplexer 154, and the output terminal of inverter 152 is further coupled to a second input terminal of multiplexer 154.

In some implementations, inverter 152 can be configured to invert an input signal received on the command bus 116 to generate an inverted signal. In some implementations, multiplexer 154 can be configured to select, based on a control signal, one of two input signals including a first input signal that is received as the input signal of inverter 152 and a second input signal that is received as the inverted signal of inverter 152, and transmit the selected input signal to controller 120.

Controller 120 of IC chip 100 is configured to manage and coordinate operations of various components within in IC chip 100. Controller 120 serves as an interface between computation engines 130 and other circuits or components of IC chip 100. Controller 120 can be configured to receive an input signal from circuit 150, and transmit an output signal to circuit 140. In some implementations, controller 120 can be communicatively coupled to computation engines 130, and can obtain computation results from computation engines 130.

IC chip 100 further includes one or more computation engines 130. Each of the computation engines 130 includes hardware components configured to perform computations in parallel with computation engines 130 of other IC chips 100. In some implementations, the computations include cryptographic hash computations, and the computation engines 130 can be referred to as hash engines. Hash engines can perform cryptographic hash computations using hash function algorithms such as SHA-1, SHA-256, or MD5, etc. In some implementations, the cryptographic hash computations are configured for cryptocurrency mining. For example, the computation engines 130 can perform hash computations to find a nonce for a current block header that makes a hash of the block header meet a difficulty target. Each IC chip 100 of multiple IC chips 100 in a common computing device can randomly choose a nonce and insert the nonce to the current block header, and generate a new block header hash. If the new block header hash is less than or equal to that indicated by the difficulty target, the IC chip 100 can generate a computation result based on the nonce, corresponding to successful mining of cryptocurrency (e.g., in a proof-of-work process). This process can be repeated until an IC chip 100 finds a nonce that produces a hash that is less than or equal to that indicated by the difficulty target.

In some implementations, the computation engines 130 are configured to perform machine learning computations, such as matrix multiplication for training and/or inference, e.g., for a large language model (LLM) or a generative AI model. Training and/or inference processes can include parallel, independent computations that are suitable for parallel performance by multiple IC chips in one or more computing devices. For example, AI/ML training and/or inference can be parallelized through data parallelism, model parallelism, pipeline parallelism, tensor parallelism, and/or other suitable methods. The computation engines 130 can be configured to perform computations based on this parallelization. For example, the computation engines 130 can be configured to perform AI/ML computations that have been parallelized using systolic array methods, pipelining, and/or the other suitable methods.

An example of an operating process of IC chip 100 includes receiving an input signal by IC chip 100 at input terminal 116-1 on the command bus 116. In some implementations, the input signal can be received from an upstream neighboring IC chip that is series-connected to IC chip 100. IC chip 100 performs an inverting operation on the input signal by using inverter 152 to generate an inverted signal, and transmits the inverted signal on the command bus 116. In some implementations, the inverted signal can be transmitted on the command bus 116 to a downstream neighboring IC chip that is series-connected to IC chip 100. IC chip 100 can further conditionally forward the input signal or the inverted signal to controller 120 based on an odd or even configuration of IC chip 100 in an ordered arrangement of multiple IC chips including the upstream neighboring IC chip, IC chip 100, and the downstream neighboring IC chip. In some examples, when IC chip 100 is an even chip on the command bus 116, circuit 150 can be instructed to forward the input signal to controller 120. When IC chip 100 is an odd chip on the command bus 116, circuit 150 can be instructed to forward the inverted signal to controller 120.

After receiving a signal from circuit 150, controller 120 can instruct the computation engines 130 to perform computations such as cryptographic hash computations or machine learning computations. Computation engines 130 can return a computation result to controller 120.

Another example of an operating process of IC chip 100 includes receiving an input signal by IC chip 100 at input terminal 118-1 on the response bus 118. The input signal can be received from an upstream neighboring IC chip that is series-connected to IC chip 100. IC chip 100 can combine the input signal and a signal produced by controller 120 by using circuit 140 to generate a combined signal, and transmit the combined signal as an output signal on the response bus 118. IC chip 100 can combine the input signal and the signal produced by controller 120 based on an even or odd configuration of IC chip 100. When IC chip 100 is an even chip on the response bus 118, IC chip 100 can combine the input signal and the signal produced by controller 120 by using AND gate 144 to generate a combined signal, and invert the combined signal by using inverter 145 to generate an inverted signal as an output signal on the response bus 118. When IC chip 100 is an odd chip on the response bus 118, IC chip 100 can invert the input signal by using inverter 147 to generate an inverted signal, and combine the inverted signal and the signal produced by controller 120 by using AND gate 146 to generate a combined signal as an output signal on the response bus 118. The output signal of IC chip 100 on the response bus 118 can be transmitted to a downstream neighboring IC chip that is series-connected to IC chip 100.

The signal produced by controller 120 can be generated based on one or more computation results from computation engines 130. The signal produced by controller 120 can be an idle signal. The signal can encode the computation results.

In some implementations, the controller 120 and/or another component of the IC chip 100 is configured to output IC chip status data. For example, the IC chip status data can be output through an output terminal 119-0 and sent from the output terminal 119-0 to a controller 204 included in a computing device with the IC chip 100. In some implementations, the IC chip status data is output through a same output terminal as computation results, e.g., terminal 118-0. The IC chip status data can include, for example, temperature data (e.g., a temperature of the IC chip 100), activity data (e.g., an activity state of the IC chip 100, such as whether the IC chip 100 is currently performing computations using the computation engines 130 or is idle), a current operating frequency (or clock frequency) based on which the computation engines 130 are performing computations, and the like. Further discussion of the IC chip status data is provided below with respect to FIGS. 4 to 6.

FIG. 1 shows an example of IC chip 100 that is configured for series connections with other IC chips. However, IC chips 100 within the scope of this disclosure are not limited thereto. For example, IC chips 100 can be configured to have power and/or data connections in parallel with other IC chips 100. An example of such an IC chip is IC chip 200 of FIG. 2B of U.S. application Ser. No. 19/035,308, which is incorporated herein by reference. For example, to be configured for parallel connections, the IC chip 100 may not include (and/or may not use or operate) terminals 110-0, 112-0, 114-0, 116-0, and/or 118-1, and/or circuits 140 and/or 150; may receive commands from a controller (such as controller 204) at terminal 116-1; and/or may provide outputs to the controller at terminal 118-0. FIGS. 1A-1B of U.S. application Ser. No. 19/035,308 (which is incorporated by reference herein in its entirety for all purposes) illustrate parallel power and data connections for IC chips, and these connections can be applied to the IC chips 100 described herein. For example, the computing device 200 of FIG. 2 has a parallel configuration of IC chips 100.

Further examples of IC chips and their operating principles are described in U.S. application Ser. No. 18/217,185, which is incorporated by reference herein in its entirety for all purposes.

Figure 2:
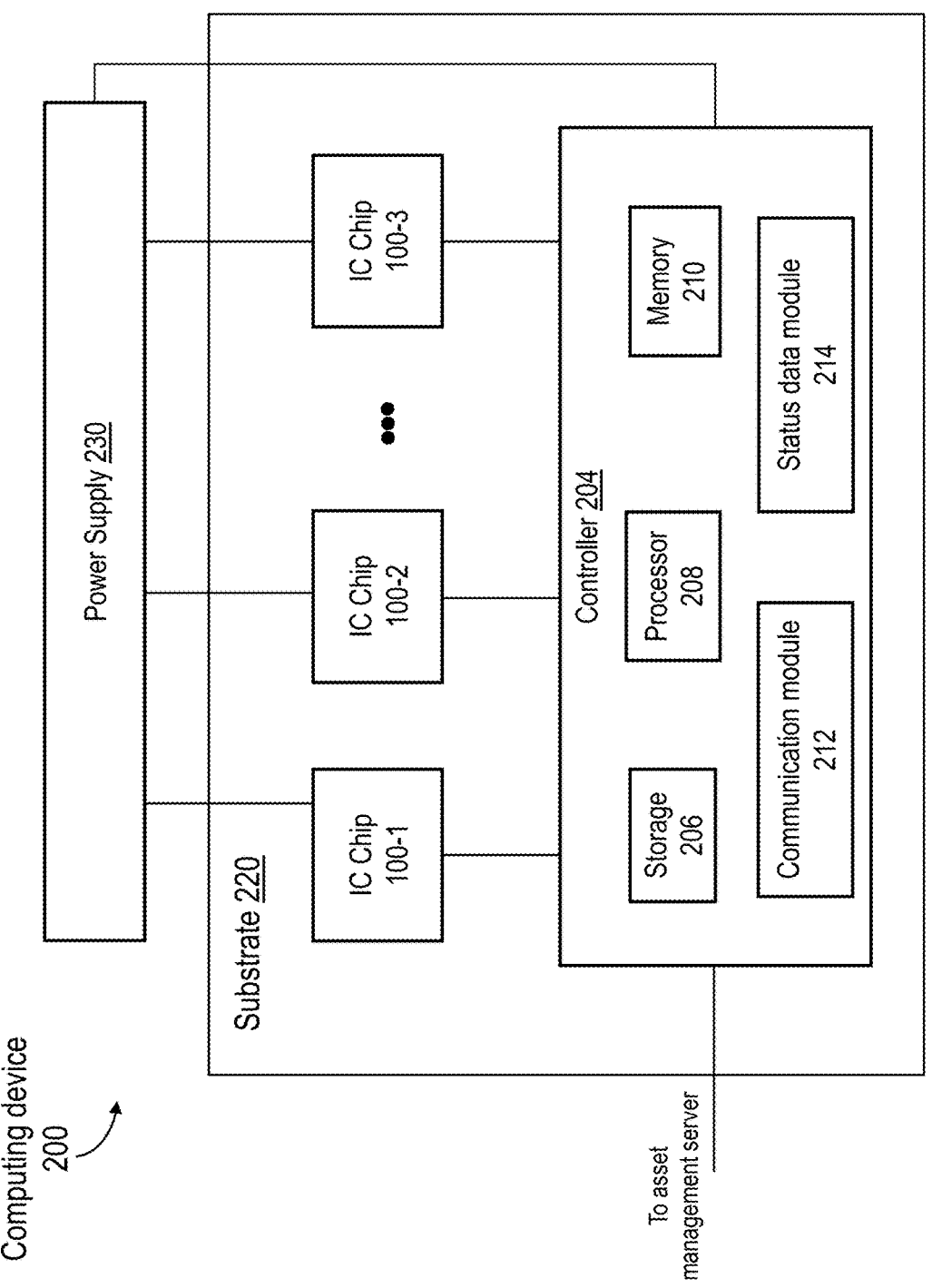
FIG. 2 is a diagram illustrating an example of a computing device including multiple IC chips.

FIG. 2 is a diagram illustrating an example of a computing device including multiple IC chips. As shown in FIG. 2, a computing device 200 can include multiple IC chips 100-1, 100-2, 100-3 configured to perform their computations in parallel to one another. The computing device 200 further includes a controller 204 and a power supply 230. The computing device 200 can be referred to as an "asset," e.g., a cryptomining asset (also referred to as a "miner") or a machine learning computation asset.

In some implementations, the IC chips 100 are arranged on a common substrate 220. The substrate 220 can be, for example, a semiconductor substrate, a dielectric substrate, or a printed circuit board (PCB). The IC chips 100 can be mounted on a common surface of the substrate. For example, the IC chips 100 can be mounted on the substrate using a through-hole, surface-mount, or ball-grid array (BGA) mount that electrically couples the IC chips 100 to conductive (e.g., metal) interconnections on and/or in the substrate. The substrate can be substantially planar, and the multiple IC chips 100 can be mounted in a common manner on the substantially planar substrate, e.g., using a same mounting method on a same mounting surface of an integral portion of the substrate. In some implementations, as shown in FIG. 2, the controller 204 is on the substrate 220. In some implementations, the controller 204 can be at least partially on a different substrate or otherwise separate from the substrate 220. In some implementations, the IC chips 100 are on multiple substrates. In some implementations, the IC chips 100 are in a common enclosure, e.g., a common circuit box. In some implementations, the controller 204 is in the common enclosure with the IC chips 100.

The IC chips 100 can perform the computations and processing described with respect to FIG. 1 based on commands/instructions sent to the IC chips 100 by the controller 204. The IC chips 100 can perform a same type of computation in parallel to one another. For example, the IC chips 100 can use their respective computation engines 130 to, in parallel, execute a same hash function algorithm, execute a same matrix/tensor multiplication process for machine learning, and/or the like. In some implementations, the computations performed by the IC chips 100 are independent of one another. For example, in some implementations, each IC chip 100 can perform its computations based on control by the controller 204, without requiring, for the computations, data or inputs from other IC chips 100.

However, joint or mutually-dependent computations are also within the scope of this disclosure.

The controller 204 can include one or more processors 208 (referred to hereafter as processor 208), a storage 206, a memory 210, and a communication module 212. The controller 204 can be similar to the computer system 2000 described with respect to FIG. 20. The processor 208 can execute instructions stored in the memory 210, and can use the communication module 212, to perform operations such as sending instructions, inputs, and the like to the IC chips 100; receiving outputs and IC chip status data from the IC chips 100; sending control instructions to the power supply 230, e.g., to adjust power supplied to the IC chips 100; and/or to communicating with one or more external devices, such as the asset management server 310 and/or user device 350. For example, the controller 204 can receive output data from the IC chips 100, where the output data includes results of the parallel computations performed by the IC chips 100. The controller 204 can send the output data to the asset management server 310.

In some implementations, the controller 204 receives IC chip status data from the IC chips 100 and sends the IC chip status data to the asset management server 310. Processing of the IC chip status data can be performed, for example, by a status data module 214. The status data module 214 can be implemented as software and/or hardware, e.g., as a software module implemented by execution of the processor 208.

The power supply 230 can be a single power supply unit or can include two or more distinct power supply modules or devices, e.g., in separate enclosures and/or on separate circuit boards. In some implementations, the power supply 230 includes one or more circuit boards, for example, one or more circuit boards and associated other components (e.g., wiring, cooling unit(s), and/or the like) constituting a power supply unit (PSU). The power supply 230 can be connected to the IC chips 100 and/or the controller 204 by one or more conductive elements, such as power rails, wiring, conductive mounts/standoffs, cables, and/or the like. The power supply 230 can include one or more regulators, rectifiers (e.g., adjustable DC-DC regulators), and/or the like for generating voltages supplied to the IC chips 100 and/or the controller 204. The IC chips 100 and/or the controller 204 can operate based on the supplied voltages.

The IC chips 100, the controller 204, the power supply 230, and elements thereof can be connected together by suitable wires, traces, vias, cables, mounts, and/or the like.

In some implementations, the computing device 200 can be configured to operate in a first power mode (or power state) or a second power mode (or power state). In some implementations, the first power mode can be referred to as a "normal" or "active" power mode. In some implementations, the second power mode can be referred to as a "standby," "sleep, or "off" power mode. In the first power mode, the IC chips 100 can receive instructions, perform their same type of computations in parallel (e.g., cryptographic computations), and output computation results to the controller 204. In the first power mode, computation engines 130 of the IC chips 100 can execute computations.

In the second power mode, the computations of the IC chips 100 can be terminated. For example, the computation engines 130 can stop execution. For example, cryptographic and/or machine learning computations by the IC chips 100 can be terminated. In some implementations, in the first power mode, the IC chips 100 receive power from the power supply 230. In some implementations, in the second power mode, the IC chips 100 are unpowered, e.g., do not receive power from the power supply 230.

Power consumption by the computing device 200 and/or IC chips 100 thereof may be significantly higher in the first power mode than in the second power mode, e.g., based on operation or non-operation by the computation engines 130.

In some implementations, to switch from the first power mode to the second power mode, the controller 204 can send commands to controllers 120 of the IC chips 100 to cause the IC chips 100 to terminate computation. Responsive to the commands, the controllers 120 can cause the computation engines 130 to terminate computation. In some implementations, to switch from the second power mode to the first power mode, the controller 204 can send commands to controllers 120 of the IC chips 100 to cause the IC chips 100 to perform computation. The controllers 120 can cause the computation engines 130 to perform computation. In some implementations, to switch from the first power mode to the second power mode, the controller 204 can send a command to the power supply 230 to terminate provision of power to the IC chips 100. In some implementations, to switch from the second power mode to the first power mode, the controller 204 can send a command to the power supply 230 to provide power to the IC chips 100. Any suitable signal/command type and/or encoding can be used for providing these commands, instructions, and other control signals described herein.

In some implementations, in the second power mode, at least some operations of the controller 204 are enabled. For example, at least some operations of the communication module 212 may be enabled in the second power mode, such that the controller 204 can communicate with an asset management server and/or user device.

In some implementations, power mode can be switched on a per-IC chip 100 basis. For example, one or more of the IC chips 100 of the computing device 200 can be switched from the first power mode to the second power mode, while remaining IC chips 100 may not be switched. In some implementations, to selectively switch the power mode of the IC chips 100, the controller 204 can selectively send switch commands only to the IC chips 100 that are to be switched. In some implementations, to selectively switch the power mode of the IC chips 100, the controller 204 can send switch commands that indicate the IC chips 100 that are to be used switched. For example, the switch commands can include IC chip identifiers (e.g., serial numbers) and/or the like. When a controller 120 of an IC chip 100 receives the switch command, the controller 120 can check whether the IC chip 100 is indicated by the switch command. If so, the controller 120 can switch the power mode of the IC chip 100, e.g., by controlling the computation engines 130 of the IC chip 100 to terminate/start computation. As such, based on selective control, IC chips 100 can operate in multiple power modes (such as first/second power modes). Power mode can be switched/set for the entirety of the computing device 200 (e.g., for all IC chips 100 of the computing device 200) and/or selectively for a subset of the IC chips 100 of the computing device 200.

Instead of, or in addition to, control of the power mode of the IC chips 100, in some implementations the controller 204 can control performance level(s) of the IC chips 100, e.g., in a gradated manner where different performance levels correspond to different computation rates. For example, each IC chip 100 may be able to operate at varying supply voltage levels and/or at different clock frequencies (clock speeds). The clock frequency may correspond to a clock rate with which the computation engines 130 operate.

Higher supply voltages and higher clock frequencies may be associated with higher computation rates and power consumption, and lower supply voltages and lower clock frequencies may be associated with lower computation rates and lower power consumption.

In some implementations, the controller 204 can control supply voltages for IC chips 100 of the computing device 200 by controlling the power supply 230 to adjust its output supply voltage, which is received and utilized by the IC chips 100. In some implementations, the controller 204 can control clock frequencies of the IC chips 100 by sending control signals to the IC chips 100, the control signals indicating the clock frequencies. The IC chips 100 can receive the control signals and adjust their internal clocks based on the clock frequencies, e.g., by adjusting internal phase-locked loops (PLL) of the IC chips 100. As another example, the controller 204 can directly provide clock signal(s) to the IC chips 100, the clock signal(s) determining clock frequencies of the IC chips 100. The supply voltage and the clock frequency are examples of computing parameters according to which the IC chips 100 operate.

From the foregoing description, it will be understood that power consumption by the computing device 200 can be highly variable depending on the current operational states (e.g., power modes) and computing parameters of the computing device 200 and/or IC chips 100 thereof. As discussed below in reference to FIGS. 7 and 11-14, according to some implementations of the present disclosure, computing devices 200 can be controlled based on their grouping into "sites" that correspond to grid meters, permitting grid-aware control of computing devices 200.

Figure 3:
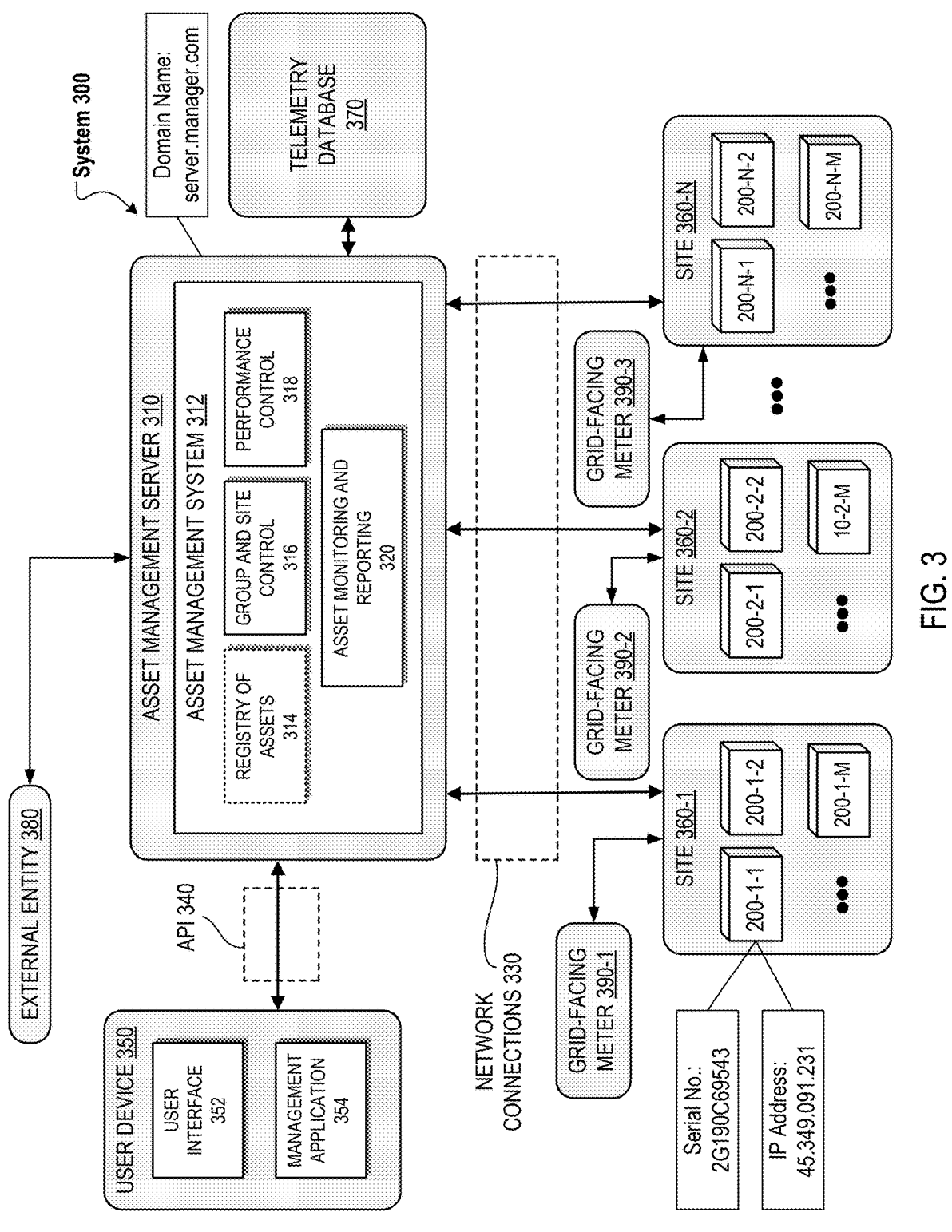
FIG. 3 is a diagram illustrating an example of a system including an asset management server and multiple computing devices.

FIG. 3 is a schematic diagram illustrating an example of a system (or computer network) 300 including an asset management server 310 and multiple computing devices 200.

The asset management server 310, sometimes referred to as a Fleet Management Console (FMC), can be a dedicated hardware device or data center located in a "central" location for centralized control of the computing devices 200. Alternatively, the server 310 can be a cloud server dispersed over one or more data centers in one or more locations. In the example of FIG. 3, computing devices 200 are grouped into multiple sites 360-1 through 360-N, where each site 360 shares a common grid-facing meter 390-1 through 390-N through white the computing devices 200 of the site 360 receive power (electricity). Site-based control based on the grid-facing meters 390 is discussed in further detail below in reference to FIGS. 7 and 11-14.

The sites 360 can correspond to data centers, e.g., the computing devices 200 in a given site can each be in a common data center. For example, a first collection of computing devices 200-1-1 through 200-1-M are grouped into a first site 360-1 (e.g., housed in a first data center) and receive electricity through a first grid-facing meter 390-1, a second collection of computing devices 200-2-1 through 200-2-M are grouped into a second site 360-2 (e.g., housed in a second data center) and receive electricity through a second grid-facing meter 390-2, and so on. In general, the system 300 can include any number of computing devices 200, e.g., one thousand, ten thousand, one hundred thousand, one million, or more computing devices 200, in any number of sites 360, e.g., one, two, five, ten, fifty, one hundred, or more sites 360. Each computing device 200 can include multiple IC chips 100 (e.g., tens, hundreds, or more), such that the asset management server 310 can be responsible for managing a large number of IC chips 100. The server 310 is configured to control each computing device 200 in the system 300 such that each computing device 200 performs computations as directed by server 310. Various ways server 310 can manage and control the computing devices 200 are described in the following.

The system 300 can be or include a wide area network (WAN) such that server 310 has a domain name (e.g., "server.manager.com") and each computing device 200 has a respective unique identifier (UID) in the form of a serial number (e.g., "2G190C69543"). Each computing device 200 also has a network (IP) address (e.g., "45.349.091.231") for communicating with the server 310 via network connections 330. For example, an administrator can assign the domain name to the server 310, and the server 310 can dynamically generate the network addresses of each computing device 200 when they are connected to the network of the system 300, e.g., using Dynamic Host Configuration Protocol (DHCP). Alternatively, a network provider can generate the network addresses of each computing device 200 when they are connected to the network of the system 300. Combinations of both the server 310 and the network provider generating network addresses for the computing devices 200 can also be implemented. For example, when the server 310 and one or more computing devices 200 are first installed, respective network addresses of the server 310 and one or more computing devices 200 can be assigned by the network provider. Thereafter, the server 310 can handle generation of the network addresses for new computing devices 200 that are connected to the server 310.

The network connections 330 can be securely established and configured for bidirectional transmission of network messages using an appropriate communication protocol, e.g., using WebSocket, HTTPS, or other protocols. The server 310 can communicate with user device(s) 350 and other devices or platforms (e.g., other servers) via a secure Application Programming Interface (API) 340. For example, a user can provide user inputs to a user interface 352 (e.g., a web or mobile application) on user device 350 (e.g., a mobile, tablet, laptop, personal computer, or other device) to control any computing devices 200 that the user owns or has been assigned to control. Examples of user interfaces are illustrated in FIGS. 8-11 and 13-15.

As shown in FIG. 3, an asset management system 312 is implemented on the server 310 as computer programs to perform the various functions of the server 310. In this example, the asset management system 312 includes: a registry of assets 314, a group and site control subsystem 316, a performance control subsystem 318, and an asset monitoring and reporting subsystem 322. Note that the registry and subsystems 314-320 are shown as individual components of asset management system 312 for ease of description and illustrative purposes only, and the asset management system 312 need not be organized in the illustrated manner. The asset management server 310 can be configured to perform some or all of the functions of each subsystem 314-320.

Registry 314 includes (e.g., stores) the respective UID and network address of each computing device 200 connected to the server 310. Server 310 can use the registry 314 to maintain an ongoing record of all the computing devices 200 in the system 300, e.g., when and how long each computing device 200 has been active in the system 300, which computing devices 200 are available or unavailable, which computing devices 200 need maintenance or have gone out of service, etc. For example, the registry 314 may include at least some status data received from the computing devices 200.

Group and site control subsystem 316 allows the server 310 to perform multiple functions related to grouping of computing devices 200, including one or more of the following. The server 310 can group computing devices 200 into sites 360 and/or groups automatically and/or based on user inputs. Server 310 can automatically group multiple computing devices 200 automatically accordingly to one or more common features of the computing devices 200. For example, the server 310 can group multiple computing devices 200 into a group of computing devices or a site 360 according to a common geolocation of the computing devices 200, common hardware specifications among the computing devices 200, a common owner of the computing devices 200, etc. For example, a common geolocation of a set of computing devices 200 can indicate that the computing devices 200 are co-located at a data center and share a common grid-facing meter 390, and, in response, the server 310 can automatically store data indicating that the set of computing devices 200 are in the same site 360. As another example, within a given site 360, a first set of computing devices 200 may be assigned for control by a first entity, and a second set of computing devices 200 may be assigned for control by a second entity. In response, the server 310 can automatically store data grouping the first and second sets of computing devices 200 into separate first and second groups, respectively (while maintaining the first and second sets in the same site 360).

The server 310 may also receive user inputs through user interface 352 corresponding to a manual selection of multiple computing devices 200 that are to be grouped together into a group of computing devices 200 and/or a site of computing devices 200. The selection can include, for example, setting group and/or site on a per-computing-device basis or for multiple computing devices 200 together; moving computing device(s) 200 from a first group to a second group and/or from a first site to a second site; and/or the like. Server 310 can also control a group's visibility and accessibility to user devices 350. Further discussion of user configuration of groups and sites is provided below with respect to FIGS. 9-11 and 13-15.

Performance control subsystem 318 allows server 310 to perform functions relating to control of computing devices 200. For example, the server 310 can determine computing parameters of computing devices 200, power modes of computing devices, and/or the like. These and/or other operational parameters can be determined subject to various constraints and/or the to achieve various objectives. For example, the server 310 can control the computing devices 200 so as to maximize a profit level, a computation rate, or other single or joint parameter indicated by a group-specific objective. The server 310 can control the computing devices 200 so as satisfy a site-specific power plan. The server 310 can receive user inputs indicative of group-specific objectives and/or site-specific power plans, e.g., from the user device 350. The server 310 can generate site-specific power plans based on dynamic data 708, discussed below in reference to FIG. 7. Further discussion of control operations by the server 310 is provided below in reference to FIGS. 7 and 9-15.

Asset monitoring and reporting subsystem 320 allows server 310 to perform functions relating to status monitoring and reporting of any and all computing devices 200, including one or more of the following. The server 310 can provide reporting parameters to the computing devices 200, based on which the computing devices 200 report status data to the server 310. The server 310 can receive (e.g., as pushed status data) status information of each computing device 200 while the computing device 200 is in operation, such as contemporaneous (real-time), or near-contemporaneous (near-real-time) status tracking. For example, the status information can include a temperature of the computing device 200, a memory usage of the computing device 200, cache hit metrics of the computing device 200, computation rate of the computing device 200, and/or any of the other status information discussed below (e.g., as discussed with respect to FIGS. 4-6 and 8-11. Using the asset monitoring and reporting system 320, the server 310 can generate reports indicative of (e.g., including) the status information, and can send the reports to user devices 350. Further discussion on how the server 310 can obtain and process status information is provided below with respect to FIGS. 4-6 and 8-11.

The user device 350 can implement one or more software to access the asset management server 310 using API 340. For example, a management application 354 installed on the user device 350 can present the user interface 352, receive user inputs through the user interface 352, and send data indicative of the user inputs to the server 310. The management application 354 can be, for example, a dedicated application/software or a web browser. For example, the web browser can access a webpage corresponding to the server 310 (e.g., hosted at the "server.manager.com" domain) to be provided with a user interface 352 through which user inputs can be provided.

The system 300 can further include a telemetry database 370. The telemetry database 370 can include a cloud storage system, e.g., an Amazon Web Services (AWS) system or similar, or any other cloud storage system. The server 310 is communicatively connected to the telemetry database 370 to store data in the telemetry database 370 and/or obtain stored data from the telemetry database 370. In some implementations, the telemetry database 370 is included in the asset management server 310.

The system 300 can further include one or more external entities 380 in communication with the asset management server 310. The external entities 380 can include, for example, external data sources for information such as power prices, cryptocurrency prices, and the like. The external entities can include a utility provider 720 and/or a regulator 730 shown in FIG. 7.

Status Information

Figure 4:
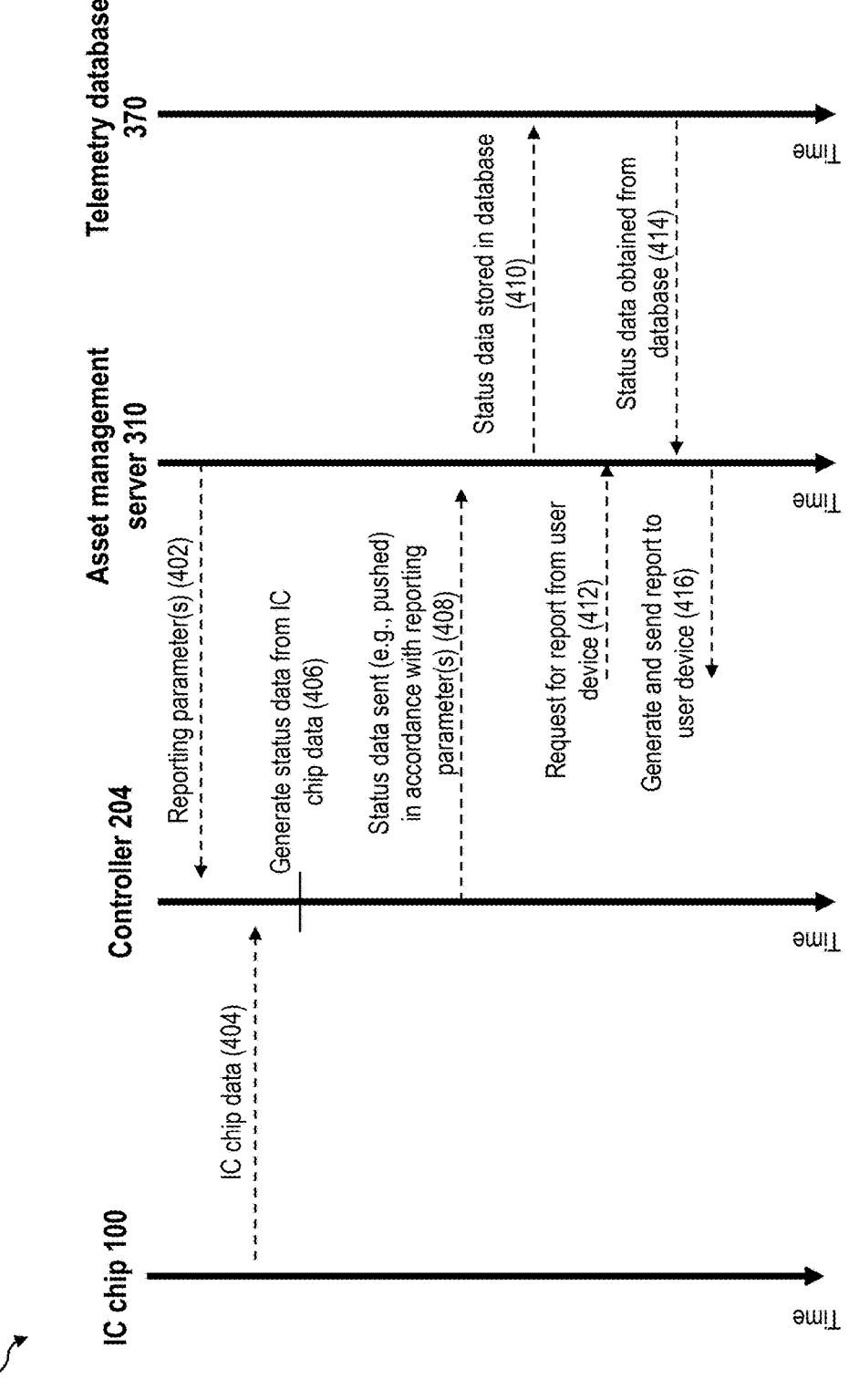
FIG. 4 is a diagram illustrating an example of a process associated with status data.

Generation, transmission, and processing of status information (or status data) will now be discussed in more detail. FIG. 4 illustrates an example of a process 400 associated with status data. As illustrated, the process 400 and portions thereof can be performed by or using an IC chip 100, a controller 204 of a computing device 200, the asset management server 310, and/or the telemetry database 370.

The process 400 includes a controller 204 obtaining one or more reporting parameters from the asset management server 310 (402). For example, the controller 204 can query the asset management server 310 to be provided with the reporting parameters. The reporting parameters can be stored locally in the controller 204, e.g., in the storage 206.

The reporting parameters can facilitate subsequent transmission (e.g., pushing) of status data from a computing device 200 of the controller 204 to the server 310. In some implementations, the reporting parameters provide (e.g., indicate or include) a reporting frequency/interval corresponding to how often the status data is to be sent to the server 310. For example, the reporting parameters can indicate that the controller 204 is to send the status data every t seconds or every t minutes. In some implementations, the reporting parameters indicate which type(s) of status data is to be included in status data sent to the server

310. In some implementations, the reporting parameters indicate a data format, of multiple data formats, that the pushed status data is to conform to. The use of the reporting parameters can facilitate a push-based reporting configuration in which computing devices 200 can push status data to the server 310, e.g., without requiring the server 310 to request the status data. The benefits of this configuration are discussed in more detail below.

Figure 5:
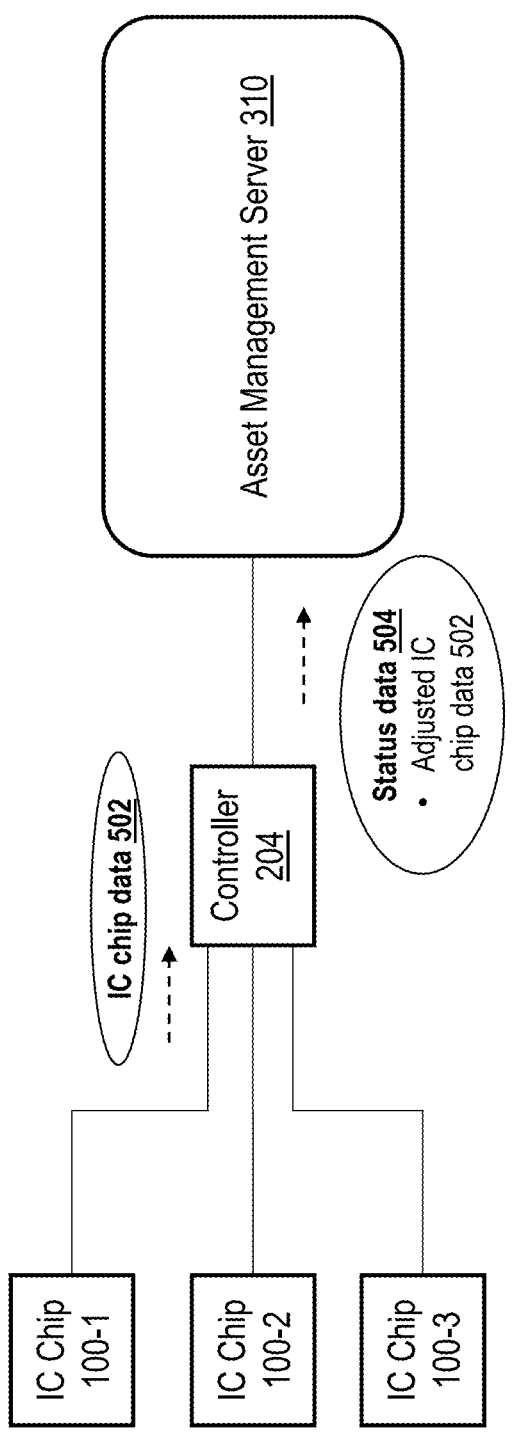
FIG. 5 is a diagram illustrating an example of status data processing.

The process 400 further includes an IC chip 100, included in a same computing device as the controller 204, sending IC chip data to the controller 204 (404). This operation can be performed, for example, by status data module 214. An example of this process is shown in FIG. 5, illustrating that multiple IC chips 100-1, 100-2, 100-3 can send IC chip data 502 in parallel with one another. For example, the IC chips 100 can use one or more terminals (e.g., STATUS_O terminal 119-0, shown in FIG. 1), to send data providing the IC chip data 502 to the controller 204. Series transmission of the IC chip data 502 to the controller 204 is also within the scope of this disclosure.

The IC chip data 502 can include any suitable data characterizing operation of the IC chip 100. In some implementations, the IC chip data 502 provides an operational state of the IC chip 100, e.g., whether the IC chip 100 is currently performing computations using its computation engines 130. In some implementations, the IC chip data 502 provides a current power mode of the IC chip 100, e.g., whether the IC chip 100 is in an active mode or a standby mode. In some implementations, the IC chip data 502 includes a current computation rate (e.g., hash rate, or a rate of performing another computation such as matrix multiplication) of the IC chip 100. In some implementations, the IC chip data 502 includes a current power consumption of the IC chip 100. In some implementations, the IC chip data 502 provides a health status of the IC chip 100, e.g., whether the IC chip 100 is in an error mode or has detected an error. In some implementations, the IC chip data 502 provides a temperature of the IC chip 100, e.g., as sensed by a temperature sensor of the IC chip 100. In some implementations, the IC chip data 502 includes a memory usage of the IC chip 100, cache hit metrics of the IC chip 100, and/or other computational data. Other types of data are also within the scope of this disclosure. The controller 204 can optionally store the retrieved IC chip data 502 in storage 206, such as in a cache or in a non-volatile storage.

In some implementations, the IC chip data 502 is requested by the controller 204, and the IC chips 100 send the IC chip data 502 responsive to the request. For example, the controller 204 can periodically request the IC chip data 502 in preparation for sending status data 504, discussed below. For example, if the reporting parameters indicate that status data is to be sent every t minutes, the controller 204 can request the IC chip data 502 every t minutes. In some implementations, the IC chip data 502 is pushed by the IC chips 100 without a corresponding request by the controller 204.

Referring again to FIG. 4, the controller 204 generates status data from the IC chip data (406). The status data 504, represented in FIG. 5, can include the IC chip data 502 processed in one or more suitable ways. The status data 504 can be referred to as telemetry data.

In some implementations, the status data 504 includes a adjusted version of the IC chip data 502. For example, the controller 204 can execute a suitable compression algorithm to compress the IC chip data 502 and reduce a data size of the status data 504, compared to corresponding IC chip data 502. Performing compression or other adjustment "on-chip"

(on-computing device 200) can represent an advantageous device configuration that is unconventional in the context of computing devices 200 that include multiple IC chips performing a same type of computation in parallel. The prevailing trends in this context have generally been to specialize computing hardware as much as possible and focus on remote management, bringing as many functions into the cloud as possible (save for the core computation function performed by the computation engines 130). However, for purposes of this disclosure, it has been recognized that expanding-rather than contracting-functionality of the controller 204 to encompass compression and other adjustments can provide advantageous computational results. For example, usage of network resources (e.g., bandwidth) associated with transmission of the status data 504 may be significantly reduced by using compression to form the status data 504.

In some implementations, compression is performed such that multiple types of IC chip data 502 (or status data) are combined into a single compressed data unit (e.g., data file). For example, a single compressed data file of the status data 504 can include both temperature data and computation rate data. This configuration can provide advantages for computational efficiency and/or network resource usage reduction.

Examples of other types of adjustment that can be performed on the IC chip data 502 include selecting a subset of the IC chip data 502 for inclusion in the status data 504, and/or processing the IC chip data 502 to determine aggregated versions thereof, such as total values, mean values, and the like.

In some implementations, the status data 504 includes data in addition to, or instead of, the IC chip data. For example, the controller 204 can contribute data to the status data 504 based on operation of the controller 204 and/or other elements besides the IC chips 100. For example, in some implementations, the controller 204 can track uptime/ downtime, power mode(s), power consumption, error statuses, and/or the like of the computing device 200 as a whole, and this (or other similar information) can be included in the status data 504. In some implementations, the status data 504 includes temperature data from one or more temperature sensors distinct from temperature sensors of the IC chips 100.

It will be understood from the above that status data (including any of the above types of status data, and other types) can be generated, processed, stored, and/or reported on an IC chip 100-basis and/or a computing device 200 basis. For example, computation rates, power consumption, and the like of the status data can indicate those values for a particular IC chip or for a computing device including multiple IC chips.

Referring again to FIG. 4, the status data (e.g., status data 504) is sent from the controller 204 to the asset management server 310, which receives the status data (408). In some implementations, the controller 204 pushes the status data to the server 310. For example, the controller 204 can push the status data according to a schedule (e.g., periodicity) indicated by the reporting parameters, and the server 310 need not specifically request or query for the status data. Pushing the status data (as opposed to querying for the status data) can represent an advantageous system configuration that is unconventional in the context of control of computing devices 200 that include multiple IC chips performing a same type of computation in parallel. As noted above, in contrast to approaches that prefer to centralize management of such computing devices and directly control all aspects of their operation, some implementations according to this disclosure include more independent operation of the computing devices 200, including having the computing devices 200 push the status data to the server 310 even (in some implementations) in the absence of a corresponding query. The computing devices 200 can push the status data without receiving a corresponding query from the server 310, and the server 310 can receive the status data without sending a corresponding query to the computing devices 200. As such, in some implementations, network resource usage associated with the queries can be reduced, the computing devices 200 can operate more efficiently by having to process fewer requests/queries from the server 310, and the system 300 as a whole can exhibit improved performance.

As shown in FIG. 4, the server 310, after receiving the status data, can store the status data in the telemetry database 370 (410). In some implementations, the stored status data includes status data that is generated by the server 310 based on status data received from the controller 204. For example, the server 310 can aggregate, process, combine, summarize, and/or perform other operations on the received status data to generate further status data that is then stored in the database 370. For example, from a computation rate and a power consumption received from the controller 204, the server 310 can determine a power efficiency by dividing the power consumption by the computation rate or by a total number of computations performed. The power efficiency can be stored as status data in the database 370.

Subsequently, the server 310 can obtain previously-stored status data (referred to hereafter as "second status data") from the database 370 (414). In some implementations, the second status data is retrieved based on (e.g., in response to) a request from a user device 350 to obtain a report of the status data (412). In some implementations, the second status data is retrieved automatically, e.g., at set intervals so as to provide reports at set intervals. The second status data can include some or all of the status data that was stored in operation 410. The second status data can include status data from multiple computing devices 200. For example, the second status data can include data from multiple computing devices 200 that are assigned to be controlled by a common entity (e.g., rented or owned by the common entity), such as an entity associated with the user device 350 receiving a report.

The second status data can include status data that was stored in one or multiple previous status data obtaining cycles. For example, the server 310 can obtain status data periodically from computing devices 200 with a defined frequency, e.g., as indicated by the reporting parameters. The second status data can include status data that was obtained in multiple of these cycles.

The server 310 generates a report based on the second status data and sends the report to a user device 350 (416). The report can include some or all of the second status data. In some implementations, the report includes summaries, highlights, analyses, and/or the like of the second status data. The report can be provided in any of various format, including video format, audio format, text format, and/or PDF format. The report can be presented in the user interface 352, e.g., a user interface of the management application 354.

An example of a report 800 is shown in FIG. 8. The report 800 is presented in the form of a PDF and includes a summary of status data collected from a group of computing devices 200 configured as miners (e.g., cryptocurrency miners). The report 800 includes a text summary of miner performance, including statistics aggregated/calculated by the server 310 from status data. Plots 804, 806 illustrate hashrate (an example of a computation rate) and uptime, e.g., as aggregated based on IC chip data/status data. Further plots 808 and 810 are based on computing device/IC chip 200 error reports of the status data. The report 800 also includes a revenue total 812, e.g., based on a total amount of cryptocurrency mined by the miners and prices of the cryptocurrency.

In some implementations, the report (such as report 800) has a format that enhances a readability and utility of the report. For example, the report can have a coloration compliant with Web Content Accessibility Guidelines (WCAG), e.g., based on foreground and background colors of the report.

As will be understood from the foregoing description, in the course of operation of the system 300, a large amount of status data may be generated, e.g., due to the large number of IC chips 100/computing devices 200 that may be present in some implementations, and/or due to the many different types of status data that may be stored in some implementations. Above, description was provided as to how status data may be more efficiently provided to the server 310 to alleviate the demands of handling the status data. In some implementations, instead of or in addition to the foregoing processes, provision of the status data to user devices 350 is performed in an efficient manner that reduces network resource usage and improves user experience.

Figure 6:
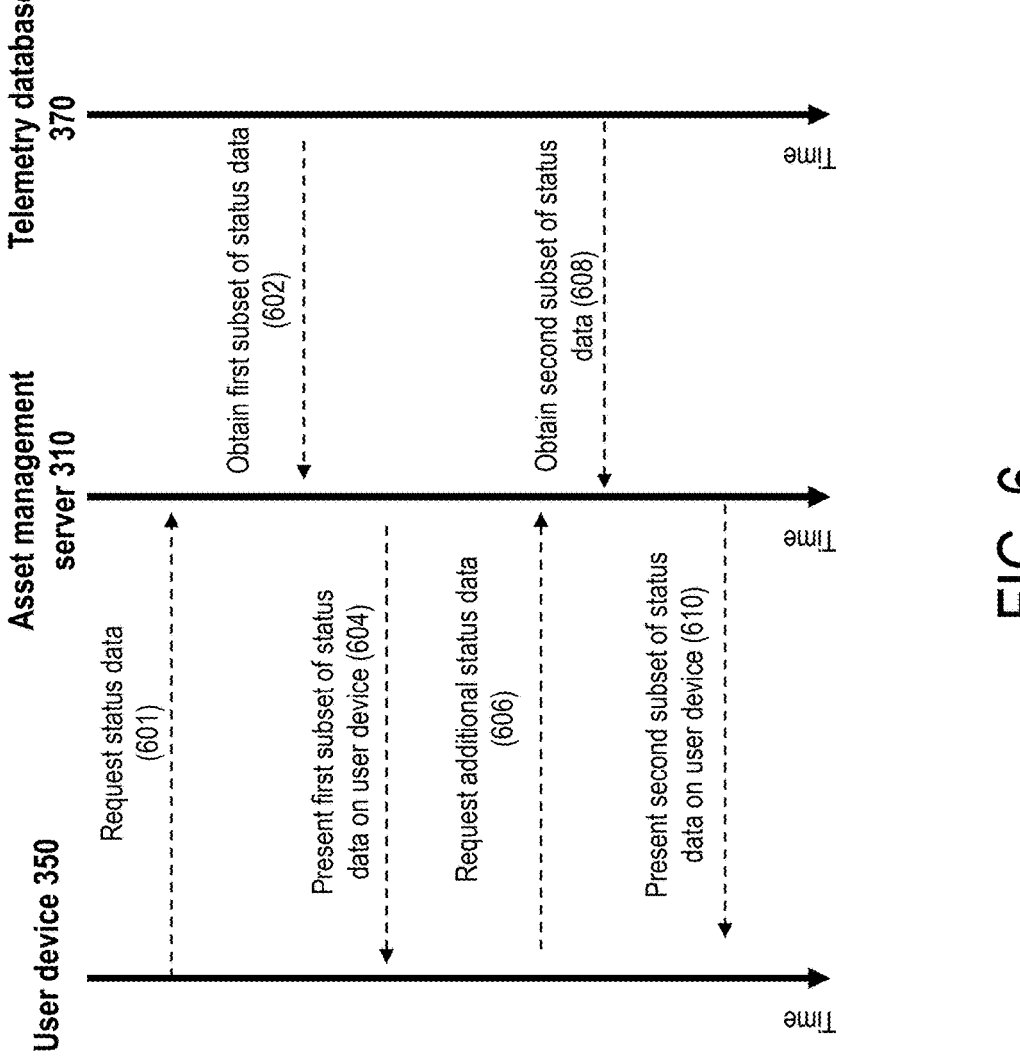
FIG. 6 is a diagram illustrating an example of a process for obtaining and presenting status data.

FIG. 6 illustrates an example of a process 600 for obtaining and presenting status data. The process 600 can be performed, for example, after status data has been stored in the telemetry database as discussed with respect to operations 402 to 410 of FIG. 4.

As shown in FIG. 6, the process 600 includes the asset management server 310 obtaining a first subset of status data from the telemetry database 370 (602). "Subset," as used herein in this context, refers to a strict subset. Operation 602 may optionally be performed in response to receiving a request from the user device 350 to obtain or be presented with status data (601). The first subset of status data may be differentiated, or characterized, in one or more ways.

In some implementations, the first subset of status data is limited to a subset of types of status data. For example, the first subset of status data may be limited to one or more types of status data that are considered to be more important or relevant that one or more other types of status data. Such type(s) that may be included in the first subset of status data can include, for example, a power consumption, a power efficiency, a computation rate, a power mode, and/or an uptime.

In some implementations, the first subset of status data is limited to status data for a subset of a larger set of available computing devices 200. The larger set of available computing devices may be, for example, a set of computing devices 200 that are controlled by, owned by, rented by, or otherwise assigned to a particular entity, e.g., an entity associated with the user device 350. The first subset of status data may be limited to status data for only a subset of computing devices 200 of the set. The subset of computing devices 200 can be selected based on, for example, a current power mode of the computing devices (e.g., computing devices 200 in an active mode can be selected), or any other suitable criteria. As another example, the subset of computing devices 200 can be a first n computing devices 200 in a sorting of the larger set based on one or more criteria, where n is an integer of one or greater. For example, the larger set may be sorted by a serial number, a power consumption, a computation rate, or any other suitable type of information, and status data for only the first n computing devices 200 in the set may be obtained, where n is less than a total number of computing devices 200 in the set. In some implementations, the subset of computing devices 200 for which status data is retrieved is computing devices 200 in one or more specified group(s) and/or one or more specified site(s).

One or more criteria based on which the first subset of status data is selected can be provided by a user, automatically determined, or determined by default. For example, a user can use the user interface 352 to select one or more types of status data that is to be included in the first subset of status data, and the user device 350 can send an indication of this selection to the server 310.

Continuing in reference to FIG. 6, the process 600 includes presenting the first subset of status data on the user device 350 (604). For example, the first subset of status data can be presented in the user interface 352. In some implementations, the user interface is generated by the server 310 and sent to the user device 350 for presentation. In some implementations, the server 310 sends the first subset of status data to the user device 350, and the user device 350 generates the user interface 352 that includes the first subset of status data.

FIG. 9 illustrates an example of a user interface 900 presented based on a first subset of status data. The user interface 900 has a table format, including a table 904, in which different rows correspond to different computing devices and different columns correspond to different types of status data of the computing devices. The computing devices are each associated with a different IP address based on which communication with the computing devices is performed. Computing devices can instead or additionally be characterized by other information, such as a model. Based on this presentation, a user can easily check the status of their computing devices (in this example, cryptocurrency "miners").

The first subset of status data that is reflected in the user interface 900 has been selected, from a larger set of status data, based on multiple criteria. As a first criteria, the first subset of status data is limited to a first subset of computing devices 902, from a larger set of computing devices assigned to a user of the user device 350 (as indicated by the text "Manage your miners . . . "). Status data for other computing devices assigned to the user is not included in the first subset of status data, and those computing devices are not presented in the user interface 900.

As a second criteria, the first subset of status data is limited to a first subset of types of status data, including "Mode" (e.g., a power mode or an optimization mode), "Power Efficiency," "Uptime," and "Hash rate."

In some implementations, because of the retrieval of only the first subset of status data, the user interface 900 can be provided with significantly reduced latency. For example, when the user device 350 requests the user interface, the server 310 need not obtain the entire set of available status data, which might require a considerable amount of time to retrieve. Instead, the server 310 can obtain only the status data that will be displayed in the user interface 900, which can be obtained relatively quickly. As such, after a user requests the user interface 900, the user interface 900 can be presented with low latency, e.g., immediately or almost immediately.

Referring again to FIG. 6, the user device 350 requests additional status data from the server 310 (606). The request can be based on one or more user interactions with the presented user interface, e.g., user interface 900. For example, a user can select (e.g., tap or click) a row of the table 904 to request additional status data relating to the computing device of that row. As another example, the user can scroll down in the table 904 to request status data for additional computing devices that are represented in lower rows of the table. As another example, the user can sort, filter, or otherwise adjust the table 904 so that the table 904 includes one or more computing devices not originally included in the user interface 900. The user device 350 can interpret these and/or other operations as requests for additional status data and send the corresponding request to the server 310.

Based on the request, the server 310 obtains a second subset of status data from the database 370 (608), and the second subset of status data is presented on the user device 350 (610). The second subset of status data can be distinct from the first subset of status data. For example, the second subset of status data can include status data for at least one computing device not included in the first subset of status data, and/or can include at least one type of status data that is not included in the first subset of status data. The second subset of status data can be based on user input on the user device 350.

Figure 10:
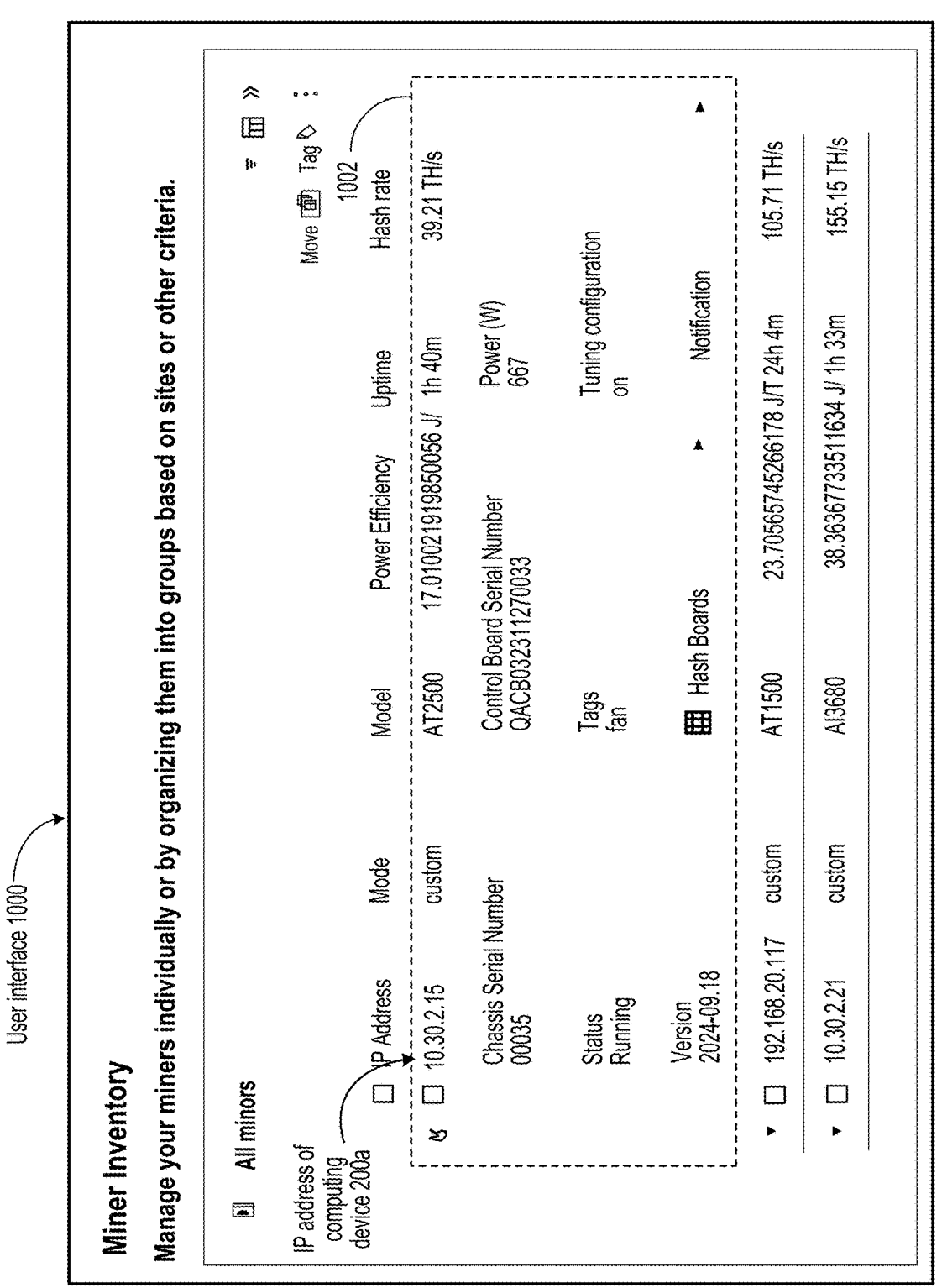
FIG. 10 is an example of a user interface presented based on a subset of status data.

For example, FIG. 10 illustrates an example of a user interface 1000 that includes status data of the second subset. The user interface 1000 can be presented based on a user selecting the row listing IP address "10.30.2.18." The selection corresponds to, and is interpreted as, a request for additional status data relating to a computing device 200*a* having IP address "10.30.2.18." Based on this selection, the server 310 obtains, as a second subset of status data, one or more types of status data for the computing device 200*a* that were not presented in the user interface 900, e.g., that were excluded from the first subset of status data. Compared to the user interface 900, the user interface 1000 is modified to include this additional status data, which is provided to the user device 350 by the server 310 (610). For example, an area corresponding to the computing device 200*a* can be expanded as a panel 1002 in which the additional status data is presented.

As shown in FIG. 10, the second subset of status data can include, for example, a power consumption and/or a version number for software executing on the computing device 200*a*.

FIG. 11 is another example of a user interface, reflecting another example of how additional status data may be requested and presented. User interface 1100 includes a "Sites & Groups" panel 1102 with which a user can interact to select one or more sites and/or one or more groups whose computing devices are to have status data presented. Computing devices in the selected site(s) and/or group(s) are included in the table 1104, and status data of these computing devices can be included in status data obtained by the server 310 and provided to the user device 350. When the user modifies the selection of site(s) and/or group(s), additional status data can be obtained to reflect the updated computing devices whose status data is to be presented. Sites and groups are discussed in further detail below with respect to FIGS. 7 and 12-15.

As another example of how additional status data may be requested and presented, a user may select a column heading (e.g., the "Power" heading 1106) to sort the table 1104 based on the value indicated by the column heading. The modified sorting may result in a modified set of computing devices being shown in the table 1104, and, correspondingly, a new subset of status data may be obtained and presented.

As another example of how additional status data may be requested and presented, a user may interact with an interface element 1108 to be provided with a menu by which the user can modify which subset of types of status data will be included in a table (e.g., the table 904 prior to expansion of status data for a particular computing devices). For example, the menu can modify which columns are shown. Based on an updated selection of the types of status data to be presented, a new subset of status data (having the newly-selected type(s)) can be obtained and presented.

In some implementations, because retrieval of status data from the database 370 is performed for subsets of status data (e.g., on an as-needed basis), a total amount of status data obtained from the database 370 may be correspondingly reduced. Accordingly, network resource consumption (e.g., bandwidth usage) associated with obtaining status data can be reduced. Further, latency in presentation of status data can be reduced, because fewer data needs to be transferred before status data is presented on the user device 350.

Group and Site Control

Some implementations according to the present disclosure provide group-based and site-based control of computing devices 200. This control can be performed in a grid-aware manner that conforms IC chip tuning and optimization to electrical grid objectives and constraints.

Figure 7:
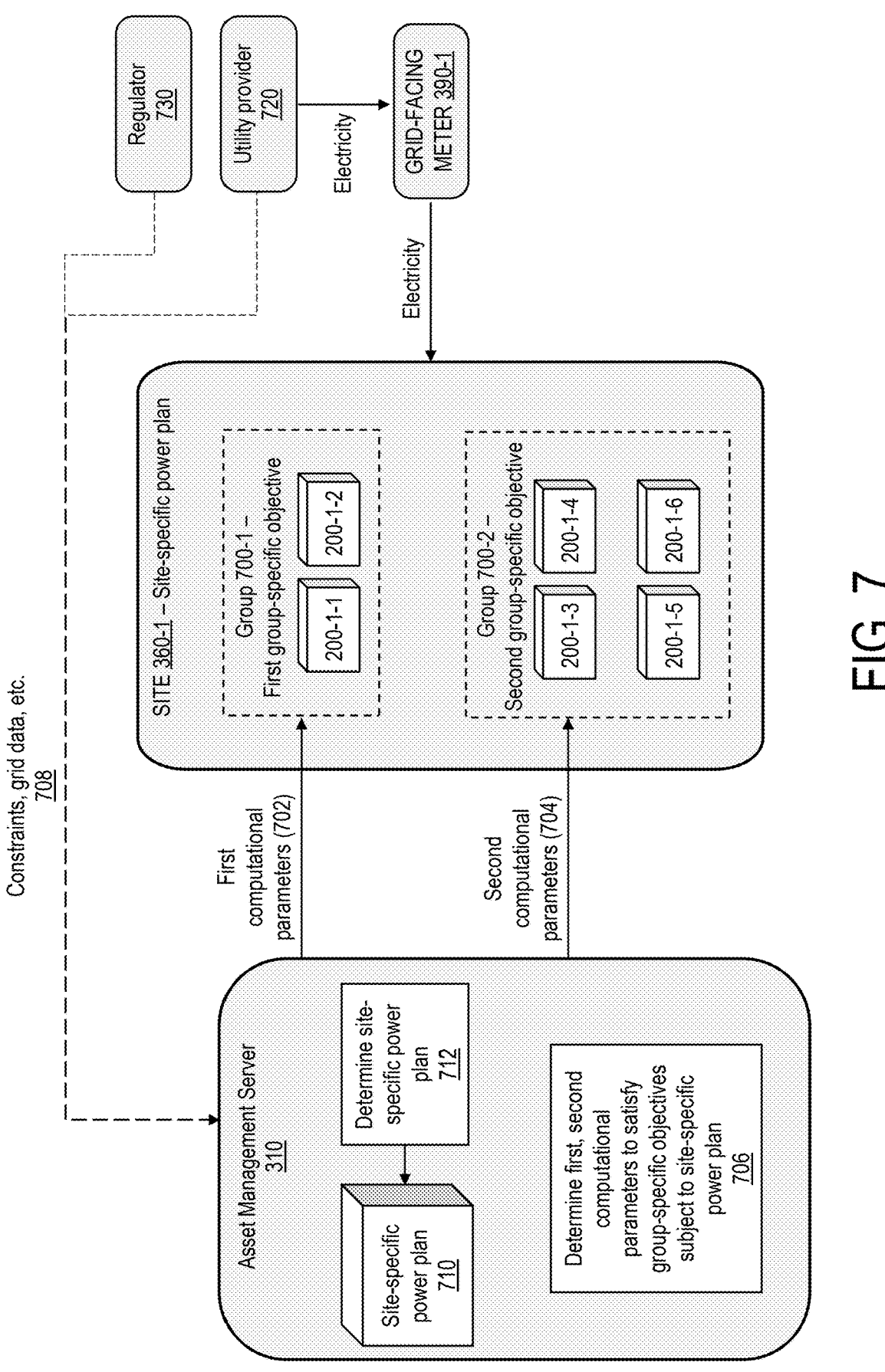
FIG. 7 is a diagram illustrating an example of a system configuration for group-based and site-based control

FIG. 7 illustrates an example of a system configuration for group-based and site-based control. A site 360-1 includes six computing devices 200-1-1 to 200-1-6. Computing devices 200-1-1 and 200-1-2 are grouped into a first group 700-1. Computing devices 200-1-3 to 200-1-6 are grouped into a second group 700-2.

The computing devices 200-1-1 to 200-1-6 of the site 360-1 (referred to collectively as computing devices 200-1) receive electricity through a common grid-facing meter 390-1. For example, the power supplies 230 of the computing devices 200-1 may ultimately be connected to receive electricity through the grid-facing meter 390-1. The computing devices 200-1 can be in a common data center that receives electricity through the grid-facing meter 390-1. Receiving electricity "through" the grid-facing meter 390-1 includes various configurations of the grid-facing meter 390-1 in which the grid-facing meter 390-1 is configured to measure a total energy (or power) consumption by the computing devices 200-1 (e.g., all computing devices 200-1 receiving power through the grid-facing meter 390-1), e.g., based on electricity for the computing devices 200-1 passing through wiring of the grid-facing meter 390-1, based on the electricity for the computing devices 200-1 being sensed by a sensor of the grid-facing meter 390-1 (e.g., by a magnetic field-based ammeter of the grid-facing meter 390-1), and/or the like. The grid-facing meter 390-1 can be, for example, a smart meter.

Electricity for the computing devices 200-1 is provided by a utility provider 720, e.g., a public or private utilities company. The utility provider 720 may manage various sources of electricity, such as solar farms, wind farms, gas/coal power plans, and/or the like. The utility provider 720 may perform grid management functions by managing supply and demand across many customers and power sources. For example, the utility provider 720 may work to perform load-balancing, to ensure that generated electricity is consumed, to manage power surges, and the like.

According to some implementations, site-specific power plans are used to determine computational parameters of computing devices. Some implementations of the site-specific power plans can differ from other optimization/control methods that may, for example, focus on maximizing efficiency, profit, or another similar metric. Some implementations of the site-specific power plans can differ from other optimization/control methods that are based on generic groupings of computing devices and not on sites of computing devices that share a common grid-facing meter. Some implementations of the site-specific power plans can differ from configurations in which control is performed in a non-grid-aware manner, e.g., not based on real-time or near-real-time grid data, not based on real-time or near-real-time restrictions from the utility provider 720, and the like.

Referring to FIG. 7, the asset management server 310 determines a first set of computational parameters for the computing devices 200-1-1, 200-1-2 of the first group 700-1, and determines a second set of computational parameters for the computing devices 200-1-3 to 200-1-6 of the second group 700-2. The first and second sets of computational parameters can be the same or different from one another. The first and second sets of computational parameters can be determined so as to satisfy a first group-specific objective for the first group 700-1 and a second group-specific objective for the second group 700-2, respectively. The first and second group-specific objectives can be the same as or different from one another. The first and second sets of computational parameters can be determined subject to constraint by a site-specific power plan. The site-specific power plan can be based on a total power consumption by the computing devices 200-1-1 through 200-1-6 of both groups 700-1, 700-2. For example, the site specific power plan can be based on a total power consumption by all computing devices of the site 360-1/all computing devices receiving electricity through the grid-facing meter 390-1.

The computational parameters can be associated with a level (e.g., an intensity) of computation performed by the IC chips 100 of the computing devices 200. Non-limiting examples of computational parameters include: a power mode (e.g., active or standby) of each computing device 200 or IC chips 100 thereof; an IC chip supply voltage for each computing device 200 or IC chips 100 thereof; a computation rate for each computing device 200 or IC chips 100 thereof; an IC chip clock frequency for each computing device 200 or IC chips 100 thereof; a rate with which the computing devices 200 or IC chips 100 thereof ramp up or down their computation; or similar parameters. As such, determination of the computational parameters generally corresponds to control of the computing devices 200 by the asset management server 310.

It will be understood that the computational parameters are closely linked to (e.g., at least partially determine) power consumption by the computing devices 200. For example, a computing device 200 in an active (e.g., "mining" or "computing") power mode generally consumes more electricity than the computing device 200 in a standby or off power mode. Higher clock frequencies and supply voltages result in higher power consumption than lower ones. Accordingly, by determining the computational parameters of the computing devices 200-1-1 to 200-1-6, the asset management server 310 can control power consumption by the site 360-1.

The group-specific objectives can include or indicate one or more parameters/variables that are to be optimized, limited, and/or otherwise controlled on a group-specific level in determining the computational parameters. For example, the computing devices 200-1 within a specific group 700-1, 700-2 may be controlled to as to maximize a computation rate, maximize computation efficiency, maximize profit (e.g., based on a hash rate, a power consumption, and a price of cryptocurrency), operate with power consumption within a target range, achieve a target energy source mix, minimize a chance of device failure, and/or operate based on a combination of two or more of these and/or other considerations. Accordingly, the first and second group-specific objectives can define respective functions to be optimized (e.g., maximized or minimized) in determination of the first and second computational parameters, respectively (706).

Different group-specific objectives can be associated, for example, with different priorities of different entities controlling the different groups, respectively. For example, a first entity may be focused on maximizing computation rate, whereas a second entity may prefer to maximize profit subject to a maximum power consumption for the computing devices controlled by the entity. Instead, or in addition, different group-specific objectives can be associated with different types of computing devices in different groups. For example, a different groups may include computing devices with different temperature tolerances, fault histories, computation capacity, and/or the like. Group-based control permits these and/or other inter-group differences to be accounted-for when controlling the computing devices.

It will be understood that determination of the computational parameters (706) can include determination of computational parameters for entire groups of computing devices, and/or can include determination of computational parameters for specific IC chips. Differences between IC chips, even within the same computing device, may mean that it can be beneficial to tune different IC chips differently within a computing device, e.g., to have different clock frequencies, power modes, and/or the like.

As shown in FIG. 7, the first and second computational parameters 702, 704 can be determined subject to a site-specific power plan 712. The site-specific power plan 712 relates to, or bounds, one or more energy/power-related characteristics of the site 360-1 as a whole, for example, total power consumption and/or a rate of change of total power consumption.

The site-specific power plan 712 can be based on a pre-existing agreement with, or restriction set by, the utility provider 720 and/or a regulator (or system operator) 730. The regulator 730 can include a public or private entity that provides electrical grid data and/or dictates use of the electrical grid. An example of a regulator 730 is Electric Reliability Council of Texas (ERCOT).

For example, an agreement or restriction may be in place that limits a total power consumption by the site 360-1 (e.g., by the computing devices 200-1-1 to 200-1-6) to a range. The range may have a maximum value (e.g., to prevent the site 360-1 from drawing too much electricity and causing grid problems) and/or a minimum value (e.g., to provide load-balancing to ensure that generated electricity will have a load). The range may be variable. For example, the range may be different at different times of the day, at different times of the week, and/or at different times of the year, to account for varying electricity demand and supply.

Instead, or additionally, an agreement or restriction may be in place that limits a rate of change of total power consumption by the site 360-1 (or a ramp rate of power consumption by the site 360-1) to a range. The range may have a maximum value, e.g., to prevent the site 360-1 from causing a power surge in the electrical grid. A sudden decrease in power consumption by the site 360-1 may also be problematic for the electrical grid, e.g., causing transient and unexpected load imbalances. The site-specific power plan 710 can include, for example, a maximum rate of increase in power consumption and/or a maximum rate of decrease in power consumption. Too-sudden changes in operation of the computing devices of the site 360-1 may cause rapid changes in amount of consumed electricity that, if not regulated (e.g., if not limited to a maximum value) may cause problems for the grid.

Limiting the rate of change of total power consumption by the site 360-1 to a range is a qualitatively different type of control from, and not merely an extension of, optimizations that focus on, for example, power efficiency, computation efficiency, and profit. The latter parameters may be related to effective, profitable operation of computing devices, limiting computation rate to reduce a chance of computing device failure, and the like. However, control of site-wide rate of change of total power consumption is a grid-focused form of control that is not analogous to the foregoing types of control. For example, absent the electrical grid-related considerations set forth herein, there would be no reason to limit a site-wide rate of change of total power consumption (as opposed to, for example, a ramp rate of an individual computing device, which may be controlled in order to limit a temperature of the computing device).

The asset management server 310 can determine the site-specific power plan 712 for the site 360-1. In some implementations, the site-specific power plan 712 is a form of, or is directly based on, a pre-existing agreement or restriction as set forth above. For example, a contract may be in place to restrict a total power consumption by the site 360-1 and/or a rate of change of the total power consumption to a predefined range. These contracts, and other related agreements, can result in predictable operation of the site 360-1 within the electrical grid, benefiting the grid as a whole.

In some implementations, the site-specific power plan 712 is provided by a user, e.g., input on the user device 350 and sent from the user device 350 to the server 310.

Instead, or additionally, the site-specific power plan 712 can be determined in real-time or near-real time, or otherwise updated dynamically, based on real-time, near-real time, or otherwise dynamic, dynamic data 708 provided by the utility provider 720, the regulator 730, and/or other external entities 380. The dynamic data 708 can include updated constraints on grid usage by the site 360-1. For example, in the event of a grid failure, natural disaster, sudden spike in demand, or the like, the utility provider 720 or the regulator 730 may adjust limits on the power consumption and/rate of change of power consumption by the site 360-1. These adjusted limits can be provided to the server 310 as dynamic data 708, and the server 310 can determine an adjusted site-specific power plan 710 as, or in accordance with, the adjusted limits. Instead, or additionally, the dynamic data 708 can include grid data such as current electricity supply, current electricity demand, current electricity consumption, current load, and/or the like, and the server 310 can determine the site-specific power plan 710 based on the grid data. For example, the server 310 can pre-emptively change limits on power consumption and/or rate of change of power consumption in order to prevent grid problems that may be caused by the site 360-1.

Accordingly, in line with the foregoing description, the computing devices 200-1-1 to 200-1-6 of the site 360-1 can be controlled in a multi-tiered manner. The server 310 can determine the first and second computational parameters 702, 704 by solving an optimization problem. For the computing devices within each group 700-1, 700-2, optimization is performed to satisfy (e.g., maximize, minimize, etc.) a group-specific objective as discussed above. In performing optimization, the server 310 can use one or more suitable optimization methods. Such methods can include— but are not limited to—gradient methods, randomized search methods, genetic algorithm methods, and stochastic methods. In some implementations, the server 310 applies a machine learning method for optimization, executing a machine learning network that has been trained to output computational parameters.

Further, within each group 700-1, 700-2, the computational parameters determined for different computing devices 200 and/or different IC chips 100 may be different from one another, in view of the different efficiencies, fault histories, models, computational capacities, and the like of different computing devices 200 and/or different IC chips 100.

Determination of the computational parameters 702, 704 for the groups 700-1, 700-2 can be performed, for example, as described in U.S. application Ser. Nos. 18/680,247 and 18/977,137, and U.S. Pat. No. 12,243,827, each of which is incorporated by reference herein in its entirety.

Meanwhile, the site-specific power plan 710 represents an additional level of control that sits on top of the group-specific, computing device-specific, and IC chip-specific determinations/optimizations. The site-specific power plan 710 can indicate, represent, or provide one or more constraints for determination of the computational parameters 702, 704. For example, the computational parameters 702, 704 can be determined subject to the site-specific power plan 710, where the site-specific power plan 710 limits, for example, a total power consumption or a rate of change of total power consumption by the site 360-1. As such, the server 310 can resolve a constrained optimization problem, where the constraint(s) include constraint by the site-specific power plan 710.

As a non-limiting example of how the site-specific power plan 710 can be incorporated into determination by the server 310, the server 310 can determine candidate first and second computational parameters to satisfy the group-specific objectives. The server 310 can check whether the determined first and second computational parameters are predicted to result in violation of the site-specific power plan 710. For example, the server 310 can use model(s) of the computing devices 200-1-1 to 200-1-6 to predict a future power consumption, or a change in power consumption, if the candidate first and second computational parameters are selected and used for control of the computing devices 200-1-1 to 200-1-6. The model(s) can take the computational parameters as input and provide the predicted power consumption or change in power consumption as output. If the site-specific power plan 710 is not predicted to be satisfied, the server 310 can use the candidate first and second computational parameters as the computational parameters 702, 704. If the site-specific power plan 710 is determined to be violated, the server 310 can determine new, modified candidate first and second computational parameters. This process can continue iteratively until first and second computational parameters 702, 704 that (i) satisfy the site-specific power plan 710 and (ii) best satisfy, or satisfy within a threshold range, the group-specific objectives, are determined. It will be understood that other optimization and determination methods are also within the scope of this disclosure.

Figure 12:
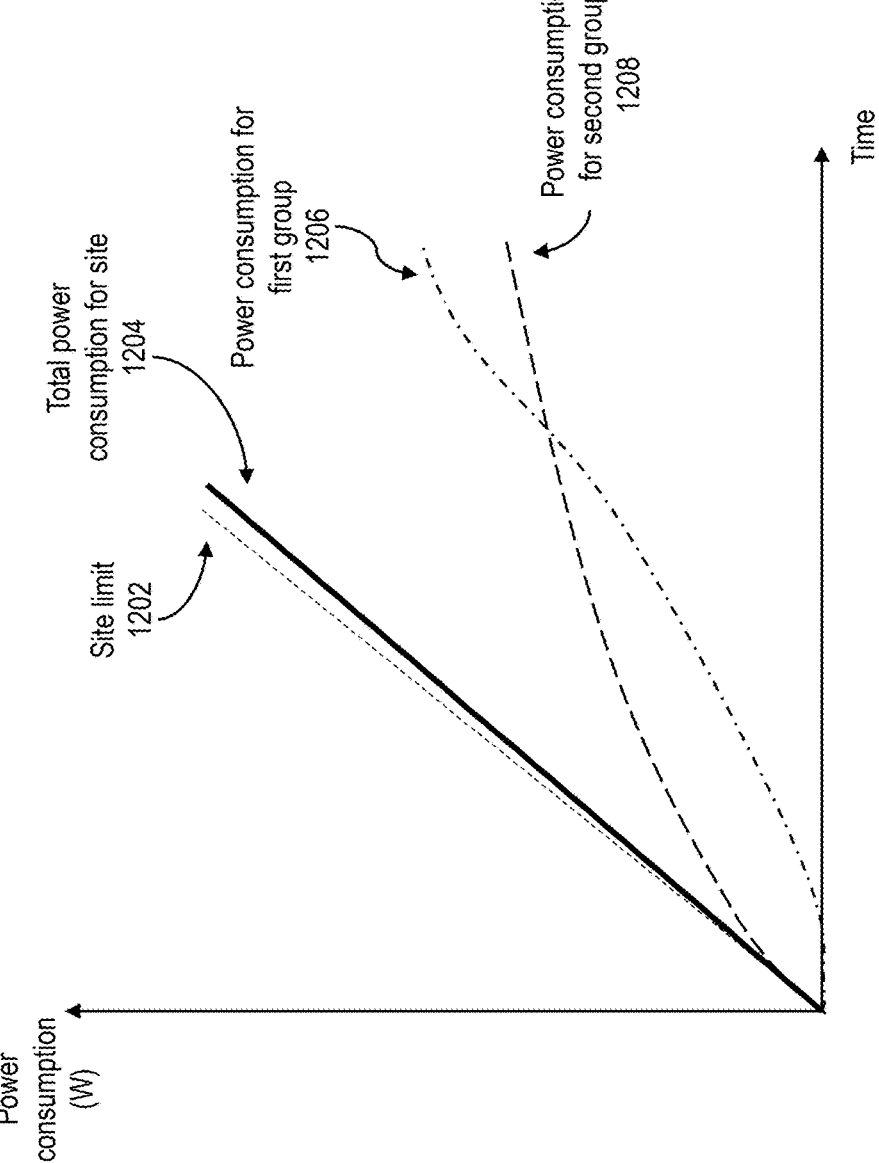
FIG. 12 is a graph illustrating an example of site-specific power plans guiding control of computing devices.

FIG. 12 is a graph illustrating an example of how site-specific power plans can guide control of computing devices. In the scenario illustrated in FIG. 12, a site having two groups of computing devices is being ramped from an off state in which computation is not being performed by computing devices in the site. A site-specific power plan indicates a limit 1202 on rate of change of total power consumption by the site. The asset management server determines computational parameters for the computing devices of the site that result in a total power consumption 1204 that rises more slowly than the limit 1202 on rate of change of total power consumption, satisfying the site-specific power plan. However, the two groups of computing devices are not controlled identically. Rather, a first group has its power consumption 1206 initially ramp more quickly than the power consumption 1208 of a second group. This may be due to differences between group-specific objectives for the two groups, differences in computing devices between the two groups, and/or the like.

It will be understood that, within each group, different computing devices and/or IC chips can be provided with different computational parameters.

Accordingly, the asset management server can perform control differentially between groups to optimize group performance while conforming to the overall limitation(s) of the site-specific power plan. In doing so, grid performance and health can be improved, regulations and contracts can be satisfied, and high computation efficiency and performance can be maintained.

Users can be provided with controls for indicating site membership of computing devices, moving computing devices between groups, and performing group-based and site-based control.

Figure 13:
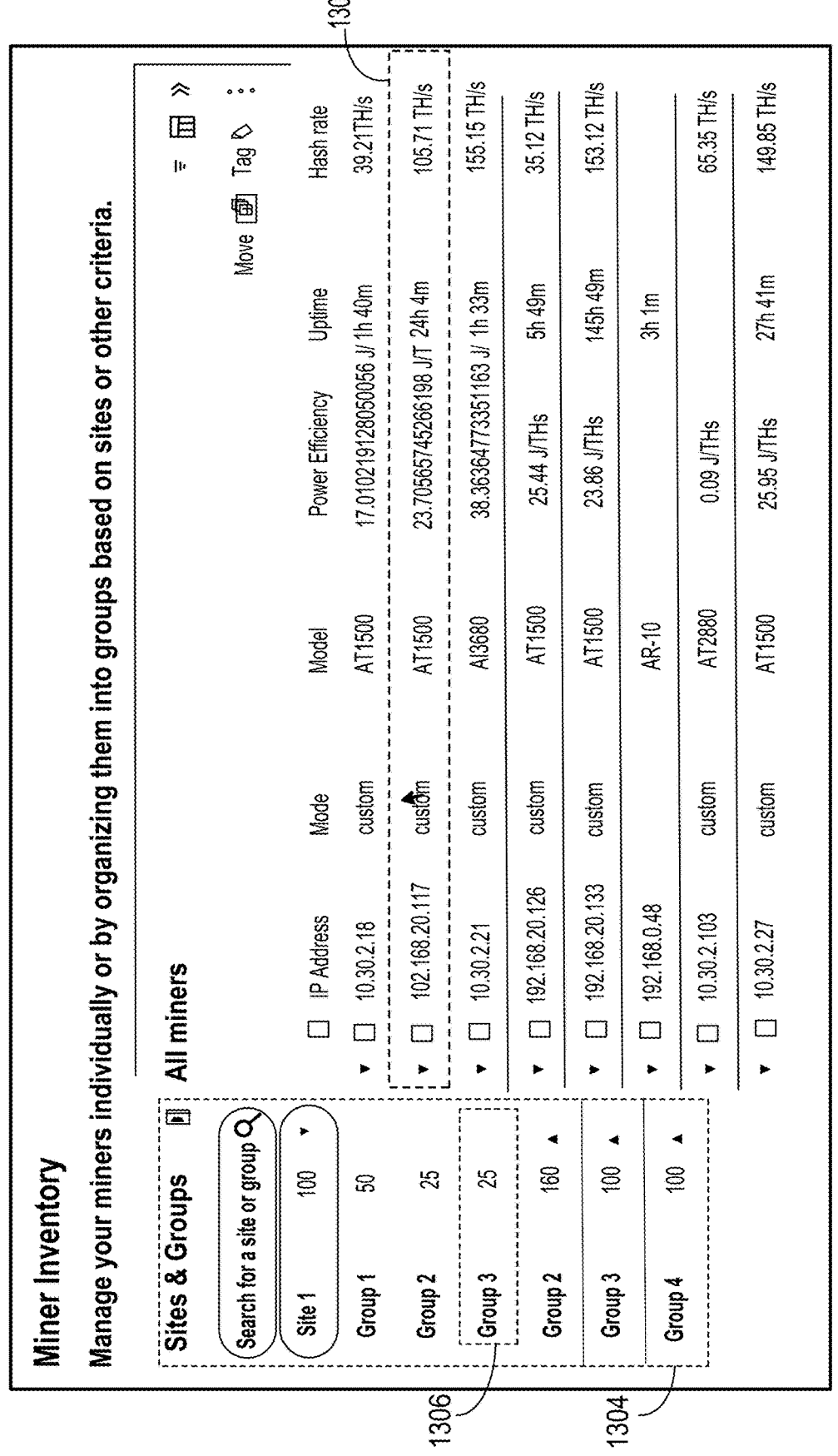
FIG. 13 is an example of a user interface reflecting group configuration.

For example, referring to FIG. 13, in a user interface 1300 similar to the user interfaces shown in FIGS. 9 to 11, a user can click-and-drag (or touch-and-drag) on a row 1302 corresponding to a computing device in "Site 1," as indicated in a "Sites & Groups" panel 1304. For example, the computing device can be in "Group1" of "Site 1." The click-and-drag operation can include a movement onto an area 1306 corresponding to "Group3" of "Site 1" to re-assign the computing device to "Group3." Similar interaction can be used to move the computing device to another site, e.g., "Site 2" or "Site 3." Selection of "Site 1" can cause display, in the adjacent table, of computing devices assigned to "Site 1" (e.g., only computing devices assigned to "Site 1"). Re-assigning a computing device between sites can be performed, for example, if the computing device has been physically moved to a different data center, or if electrical connections have been adjusted so that the computing device receives electricity through a different grid-facing meter. An indication of the re-assignment can be sent from the user device 350 to the server 310.

Figure 14:
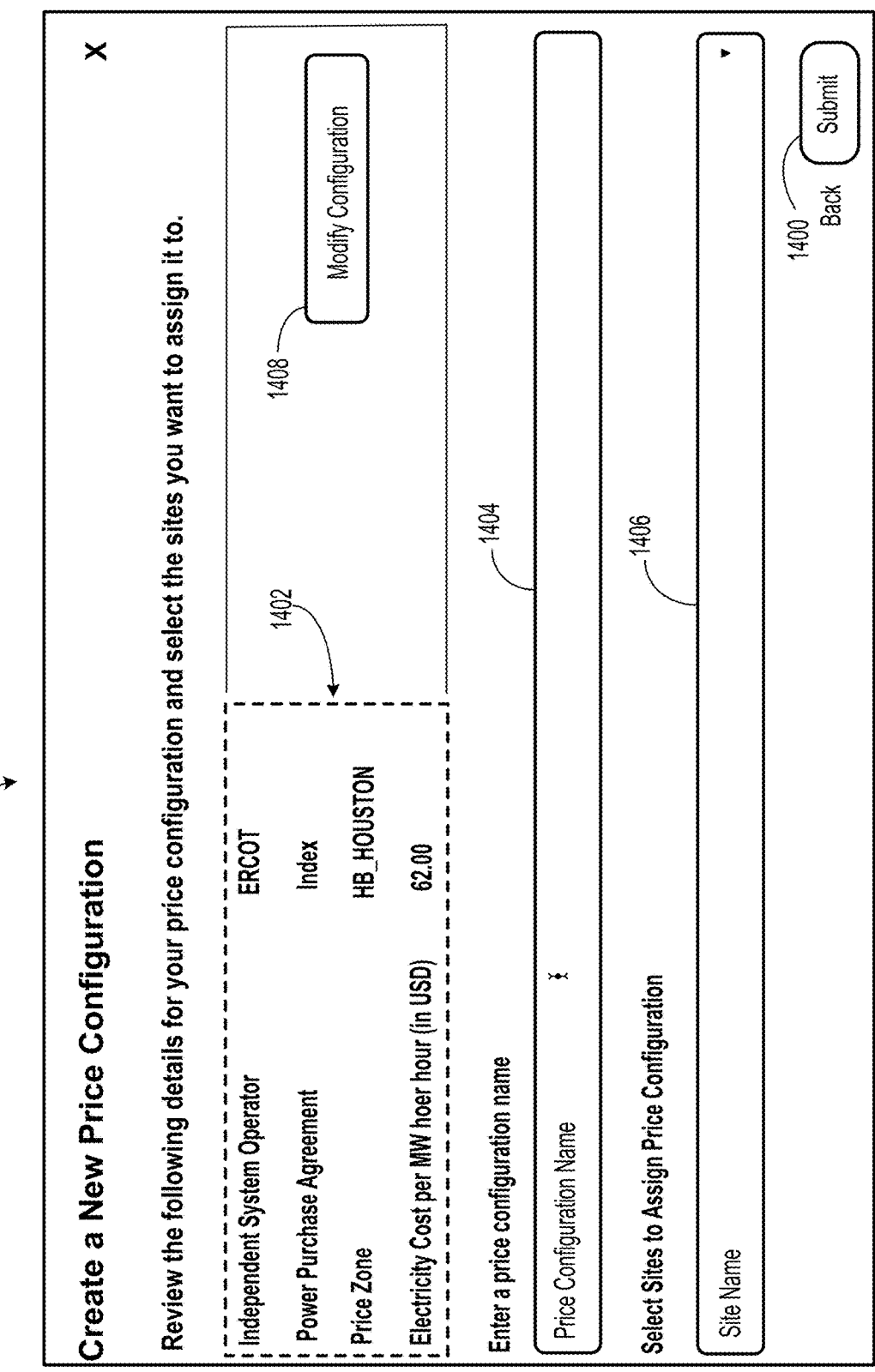
FIG. 14 is an example of a user interface for site-wide control.

Once computing devices have been assigned to sites and groups, users can perform configuration on a site-wide and/or group-wide basis. FIG. 14 illustrates an example of a user interface 1400 for site-wide control. A price configuration is associated with several parameters 1402, such as a grid operator (e.g., ERCOT), an identifier of an agreement that can include limits/requirements for a site-specific power plan (as discussed above), a price zone, and an electricity cost. Interface element 1404 can be used to name the price configuration. Interface element 1406 can be used to select site(s) to assign the price configuration. Interface element 1408 can be used to open controls for modification of the parameters 1402, e.g., control by which to select an alternative operator or power purchase agreement that might be associated with different conditions of a site-specific power plan, different dynamic data 708, and/or the like. Interface element 1410 can be used to submit the price configuration, resulting in an indication of the configuration being sent to the server 310 so that the server 310 performs control based on site-specific plans indicated by the price configuration.

Figure 15:
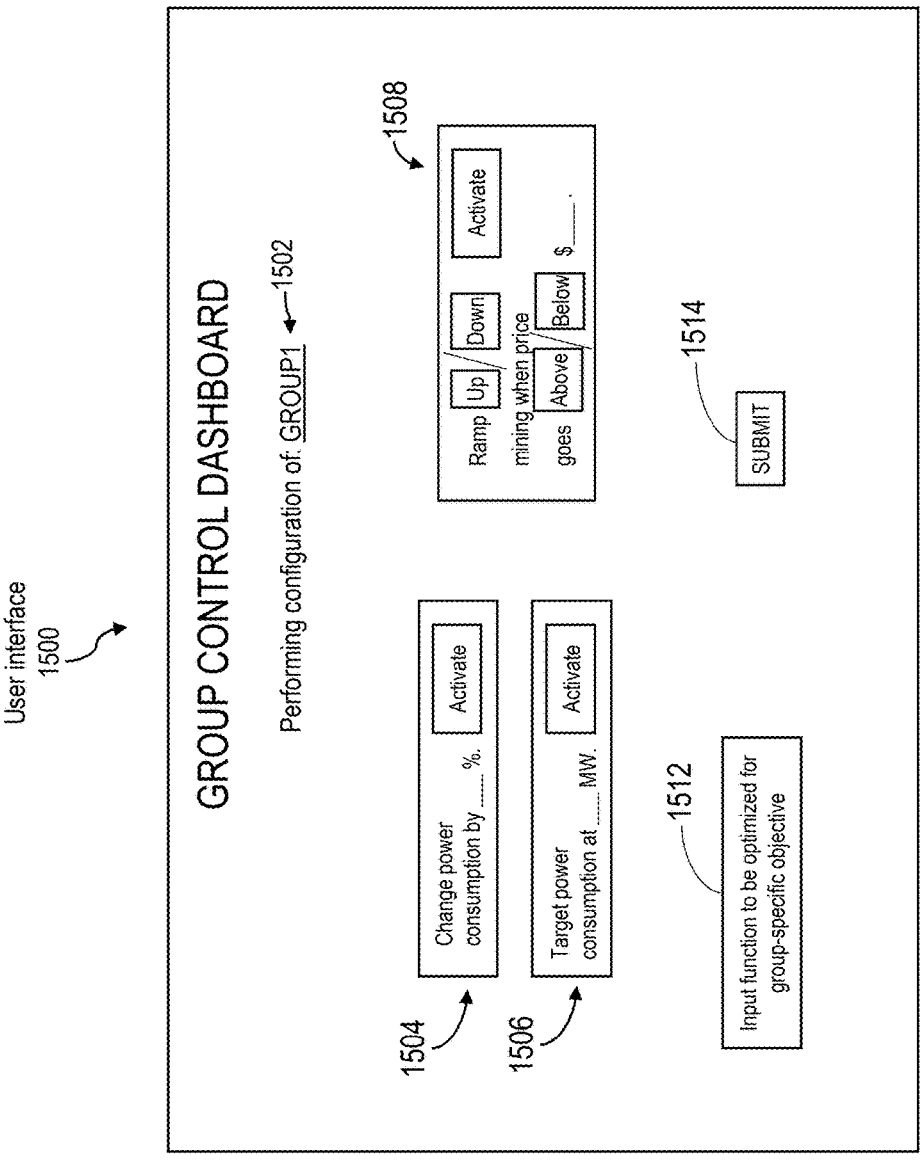
FIG. 15 is an example of a user interface for group-wide control.

FIG. 15 illustrates an example of a user interface 1500 for group-wide control. The user interface 1500 includes a list 1502 of one or more groups to receive a configuration.

Interface elements 1504 can be used to modify total power consumption by the computing devices of the group. Interface elements 1506 can be used to set a target total power consumption by the computing devices of the group. Interface elements 1508 can cause computation (in this example, mining) by the computing devices of the group to be ramped up/down in response to a parameter (in this example, price) going above or below a target value. Interface element 1512 can be used to open further controls by which a user may input or select variables/functions to be optimized or targeted for the group-specific objective for control of the computing devices of the group, e.g., to cause the server 310 to maximize a profit generated by the group, target a particular computation rate or range of computation rates, reduce a probability of device failure for the group, or a combination of these and/or other considerations. It will be understood that inputs provided using interface elements 1504, 1506, 1508 can be included in the group-specific objective, e.g., as target parameters. Interface element 1514 can be used to submit the group configuration, resulting in an indication of the configuration being sent to the server 310 so that the server 310 performs control based on group-specific objective(s) for the group.

When a site or group configuration is provided to the server 310, in some implementations, the configuration can override any existing configurations (e.g., computing device-specific configurations) for computing devices in the site or group. In this manner, uniform configuration of multiple computing devices can be performed efficiently and reliably.

As an example of how site control and group control may intersect, a regulator 730 identifies high grid demand and determines that load shedding should be performed. In accordance with a prior agreement, the regulator 730 instructs the asset management server 310 that site 360-1 should reduce its total power consumption, corresponding to a 50% decrease from its present value. The server 310 receives the instruction and initiates determination of new first and second computational parameters 702, 704 to satisfy the new constraint from the regulator 730. Group-specific objectives for groups 700-1 and 700-2 indicate that computation rate is relatively less important for group 700-1 compared to group 700-2. For example, a weight associated with a target computation rate may be lower for group 700-1 than a corresponding weight for group 700-2. This difference in configuration may, for example, indicate increased acceptance of lower computation rates by an entity controlling group 700-1 than by an entity controlling group 700-2, or it may indicate that an entity controlling both groups 700-1, 700-2 values the operation of group 700-2 more than group 700-1. Accordingly, rather than decreasing power consumption by 50% for each group 700-1, 700-2, the server 310 can determine computational parameters 702, 704 that proportionally reduce computation rate more for group 700-1 than for group 700-2, e.g., based on clock frequencies, power supply voltages, and/or power modes of the computing devices 200-1. For example, the server 310 can temporarily disable computation by proportionally more computing devices in group 700-1 than in group 700-2.

As another example, when bringing a set of multiple computing devices at a site from a first power mode (e.g., a standby mode) to a second power mode (e.g., an active or operational power mode)—for example, in response to an instruction provided by a user, based on a schedule, or the like—the server 310 can, rather than switching all the computing devices at once, switch them at least partially at different times, so as to "spread out" the turn-on and satisfy a site-specific power plan that limits a rate of increase in power consumption for the site. An order and/or a timing at which the multiple computing devices are switched to the active power mode can be based on group-specific objectives for two or more groups to which the computing devices belong.

In some implementations, groups are not limited to including computing devices in a single site. In such implementations, a group can include computing devices in multiple sites, the computing devices sharing a group-specific objective but being controlled under different constraints associated with their different sites. In some implementations, groups are limited to computing devices of a single site.

Figure 17:
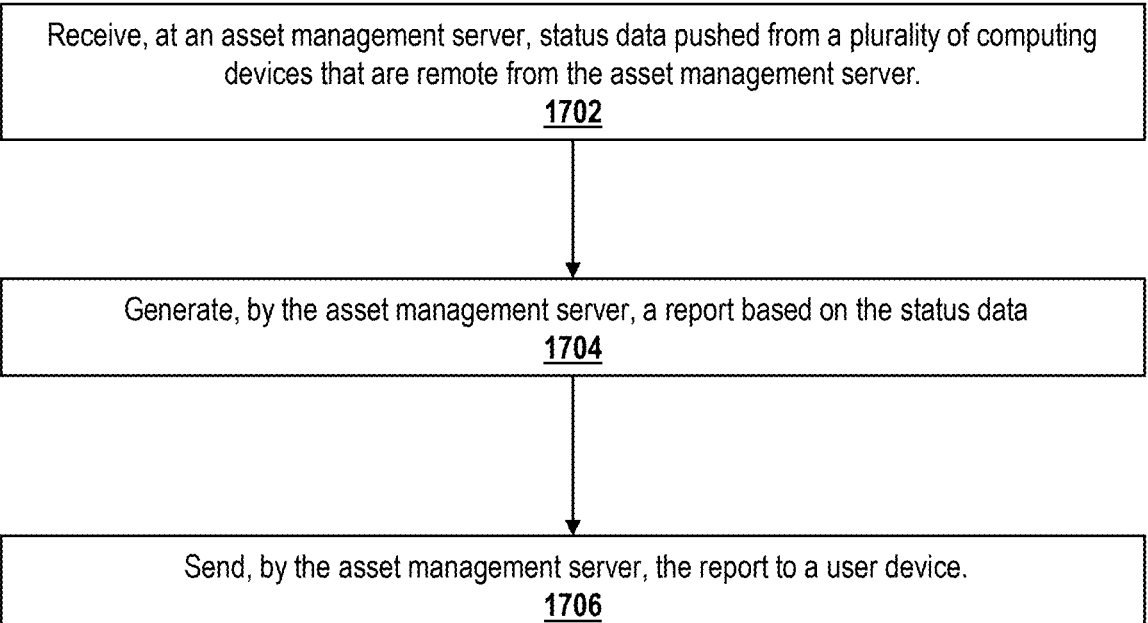

FIG. 17 illustrates an example of a process 1700 according to some implementations of the present disclosure. The process 1700 can be performed, for example, by an asset management server 310. The process 1700 includes: receiving, at an asset management server, status data pushed from a plurality of computing devices that are remote from the asset management server (1702). For example, the computing devices can be computing devices 200 as described throughout this disclosure. For example, each of the plurality of computing devices can include a plurality of IC chips configured to perform a common type of computation in parallel with one another.

In some implementations, the status data can be "pushed" as described above in reference to FIGS. 4-5, e.g., received without the asset management server sending a corresponding query.

The process 1700 includes generating, by the asset management server, a report based on the status data (1704) and sending, by the asset management server, the report to a user device (1706).

FIG. 18 illustrates an example of a process 1800 according to some implementations of the present disclosure. The process 1800 can be performed, for example, by a computer system or computing device, such as the asset management server 310.

The process 1800 includes obtaining a site-specific power plan for a first site, wherein the first site comprises a plurality of computing devices (1802). The plurality of computing devices can be assigned to the first site. Each of the computing devices can be a computing device 200. For example, each of the plurality of computing devices can include a plurality of integrated circuit (IC) chips configured to perform a common type of computation in parallel with one another.

Further, in the process 1800, the plurality of computing devices are configured to receive power through a common grid-facing meter. For example, the plurality of computing devices can be the computing devices of site 360-1. The plurality of computing devices are distinct from a second plurality of computing devices, wherein the second plurality of computing devices are assigned to a second site based on the second plurality of computing devices being configured to receive power through a common second grid-facing meter. For example, the second plurality of computing devices can be the computing devices of site 360-2.

The process 1800 includes obtaining a first group-specific objective for a first group of computing devices of the plurality of computing devices, and obtaining a second group-specific objective for a second group of computing devices of the plurality of computing devices, wherein the first group-specific objective is different from the second group-specific objective (1804). For example, the two groups can be groups 700-1, 700-2 shown in FIG. 7, each of which has a corresponding group-specific objective as discussed above.

The process 1800 includes determining computational parameters of the plurality of computing devices based on the first group-specific objective and the second group-specific objective, subject to one or more constraints corresponding to the site-specific power plan (1806). For example, a computational parameter of the first group of computing devices can be different from a corresponding computational parameter of the second group of computing device. For example, this operation can be performed as described in reference to operation 706 above.

The process 1800 includes controlling the plurality of computing devices to perform the common type of computation using the determined computational parameters (1808). For example, a power mode, a clock frequency, a supply voltage, and/or the like of one or more of the plurality of computing devices can be determined, and the computing devices can be controlled accordingly, for example, by the asset management server 310.

FIG. 19 illustrates an example of a process 1900 according to some implementations of the present disclosure. The process 1900 can be performed, for example, by a user device 350 and/or an asset management server 310. For example, the device 350 and the server 310 can operate in conjunction with one another to present the described user interfaces, receive the described user inputs, and perform corresponding control.

The process 1900 includes presenting, in a user interface, a first display indicating membership of a plurality of computing devices in a first site (1900). For example, the user interface can be the user interface 1300 shown in FIG. 13.

Each of the computing devices can be a computing device 200. For example, each of the plurality of computing devices can include a plurality of integrated circuit (IC) chips configured to perform a common type of computation in parallel with one another.

Further, in the process 1900, the plurality of computing devices are configured to receive power through a common grid-facing meter. For example, the plurality of computing devices can be the computing devices of site 360-1. The plurality of computing devices are distinct from a second plurality of computing devices, wherein the second plurality of computing devices are assigned to a second site based on the second plurality of computing devices being configured to receive power through a common second grid-facing meter. For example, the second plurality of computing devices can be the computing devices of site 360-2.

The process 1900 includes receiving, in the user interface, user inputs indicating a division of the plurality of computing devices into a first group of computing devices and a second group of computing devices (1904). For example, the user inputs can include a click-and-drag as discussed in reference to FIG. 13, and/or any other suitable type of user input.

The process 1900 includes receiving, in the user interface, a first user input indicative of a site-specific power plan for the first site, wherein the first site-specific power plan includes a constraint applicable to the plurality of computing devices (1906). For example, the first user input can be provided in the user interface 1400 shown in FIG. 14.

The process 1900 includes receiving, in the user interface, a second user input indicative of a first group-specific objective for the first group of computing devices (1908). The process 1900 further includes receiving, in the user interface, a third user input indicative of a second group-specific objective for the second group of computing devices (1910). For example, the group-specific objectives can be input using the user interface 1500 shown in FIG. 15. The first group-specific objective can be different from the second group-specific objective.

The process 1900 includes controlling the plurality of computing devices to perform the common type of computation in parallel with one another, based on the site-specific power plan, the first group-specific objective, and the second group-specific objective (1912). For example, control can be performed as described in reference to FIG. 7.

Figure 20:
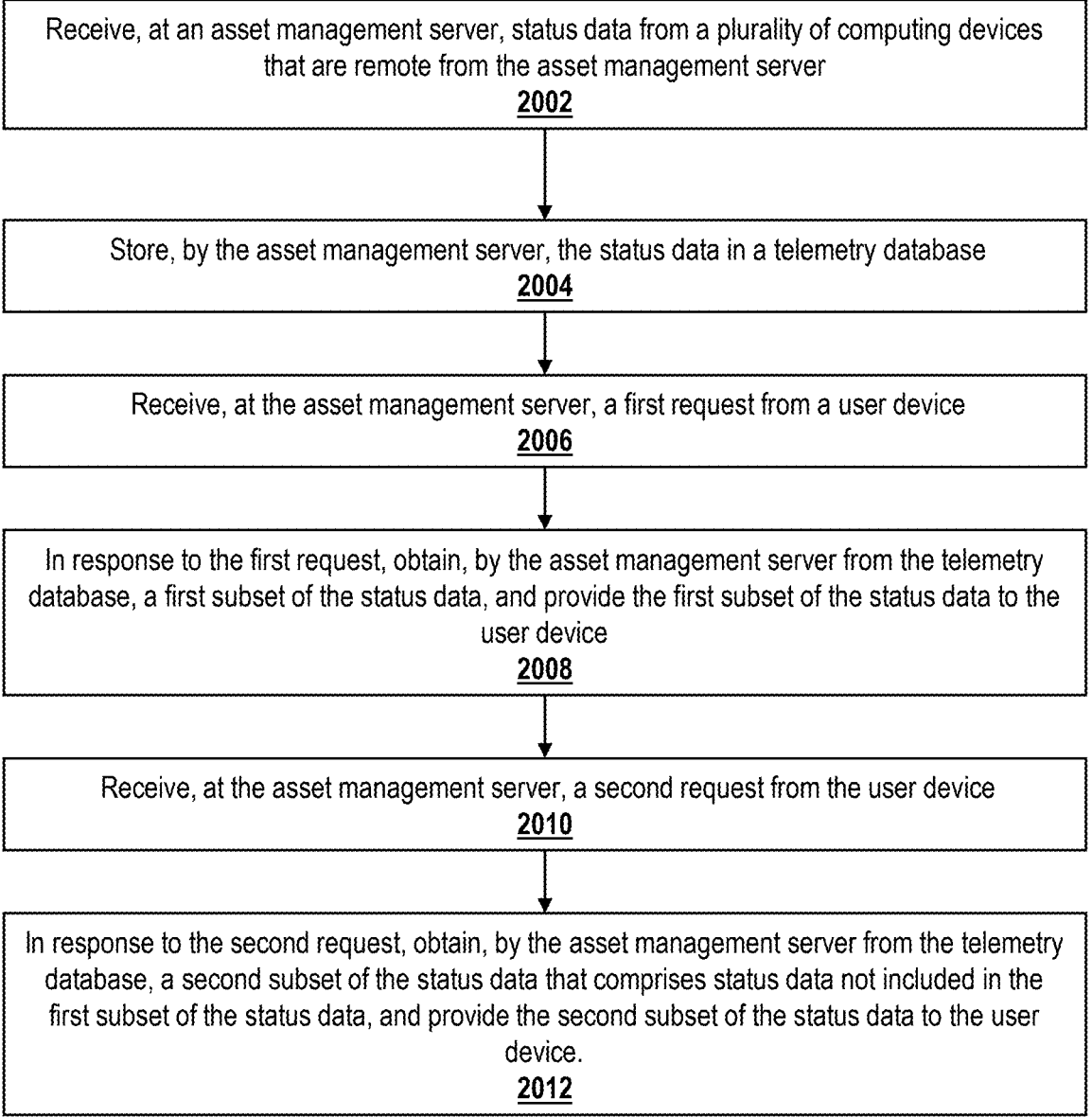

FIG. 20 illustrates an example of a process 2000 that can be performed according to some implementations of the present disclosure. The process 2000 can be performed, for example, by the asset management server 310.

The process 2000 includes receiving, at an asset management server, status data from a plurality of computing devices that are remote from the asset management server (2002). Each of the computing devices can be a computing device 200. For example, each of the plurality of computing devices can include a plurality of integrated circuit (IC) chips configured to perform a common type of computation in parallel with one another.

In some implementations, the status data includes at least one of a computation rate, a power consumption, or a computation efficiency.

The process 2000 includes storing, by the asset management server, the status data in a telemetry database (2004), such as telemetry database 370.

The process 2000 includes receiving, at the asset management server, a first request from a user device (2006); in response to the first request, obtaining, by the asset management server from the telemetry database, a first subset of the status data, and providing the first subset of the status data to the user device (2008); receiving, at the asset management server, a second request from the user device (2010); and, in response to the second request, obtaining, by the asset management server from the telemetry database, a second subset of the status data that includes status data not included in the first subset of the status data, and providing the second subset of the status data to the user device (2012). Operations 2006 to 2012 can be performed, for example, as described for the corresponding operations of FIG. 6.

Accordingly, based on the foregoing processes and device configurations, operation of systems of computing devices can be improved to obtain more efficient, effective, and customized computation by the computing devices.

Figure 16:
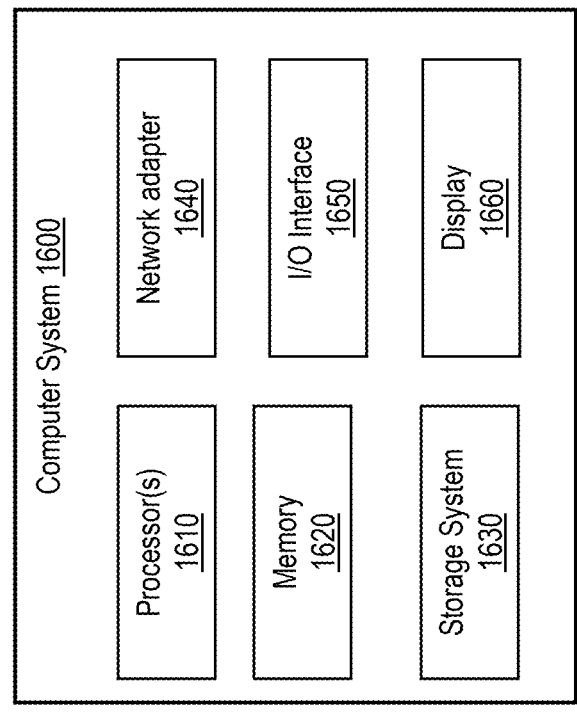
FIG. 16 is a diagram illustrating an example of a computer system.

FIG. 16 is a block diagram illustrating a computer system 1600. In some implementations, the controller 120, the user device 350, the asset management server 310, or the computing device 160 (e.g., controller 204) includes, is similar to, or is associated with, a computer system such as the computer system 1600. The computer system 1600 can be configured to perform operations described herein as being performed by any of the controller 120, the user device 350, the asset management server 310, or the computing device 200.

The computer system 1600 may refer to any system including a general purpose or special purpose computing system. For example, the computer system 1600 may include a personal computer, a server computer, a cloud computing system, a laptop computer, a home appliance, a tablet, a wearable device, a smart phone, and the like. As shown in FIG. 16, the computer system 1600 may include at least one processor 1610, a memory 1620, a storage system 1630, a network adapter 1640, an input/output (I/O) interface 1650, and a display 1660.

The at least one processor 1610 may execute a program module including computer system executable instructions. The program module may include routines, programs, objects, components, logic, data structures, and the like, performing a specific task or implementing a specific abstract data type. The memory 1620 may include a computer system readable, non-transitory medium in the form of a volatile memory such as a random access memory (RAM). The at least one processor 1610 may access the memory 1620 and execute instructions loaded in the memory 1620. The storage system 1630 may non-volatilely store information and may include at least one program product including a program module configured to perform the operations described herein for any of the controller 120, the user device 350, the asset management server 310, the controller 204, or the computing device 200.

The network adapter 1640 may provide a connection to a local area network (LAN), a wide area network (WAN), and/or a public network (e.g., the Internet), etc. The I/O interface 1650 may provide a communication channel with a peripheral device such as a keyboard, a pointing device, and an audio system. The display 1660 may output various pieces of information so that the user may check the information.

In some implementations, operations described above with respect to FIGS. 4 to 15 are implemented as or using a computer program product. The computer program product may include a non-transitory computer-readable medium (or storage medium) including computer-readable program instructions for causing the at least one processor 1610 to perform the disclosed operations. Computer readable instructions may be, but are not limited to, assembler instructions, instruction set architecture (ISA) instructions, machine instructions, machine dependent instructions, microcode, firmware instructions, state setup data, or source code or object code written in at least one programming language.

The computer-readable medium may be any type of medium capable of non-transitorily holding and storing instructions executed by the at least one processor 1610 or any instruction executable device. The computer-readable medium may be an electronic storage device, a magnetic storage device, an optical storage device, an electromagnetic storage device, a semiconductor storage device, or any combination thereof, but is not limited thereto. For example, the computer readable medium may be a portable computer diskette, a hard disk, a random access memory (RAM), a read-only memory (ROM), an electrically erasable read only memory (EEPROM), a flash memory, a static random access memory (SRAM), a compact disc (CD), a digital versatile disc (DVD), a memory stick, a floppy disk, a mechanically encoded device such as a punch card, or any combination thereof.

A number of implementations have been described. Nevertheless, it will be understood that various modifications may be made. While this disclosure contains many specific implementation details, these should not be construed as limitations on the scope of any invention or of what may be claimed, but rather as descriptions of features that may be specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results.

What is claimed is:

1. A method, comprising:
obtaining a site-specific power plan for a first site, wherein the first site comprises a plurality of computing devices,
wherein each of the plurality of computing devices comprises a plurality of integrated circuit (IC) chips configured to perform a common type of computation in parallel with one another, and
wherein the plurality of computing devices are configured to receive power through a common grid-facing meter;
obtaining a first group-specific objective for a first group of computing devices of the plurality of computing devices, and obtaining a second group-specific objective for a second group of computing devices of the plurality of computing devices, wherein the first group-specific objective is different from the second group-specific objective;
determining computational parameters of the plurality of computing devices based on the first group-specific objective and the second group-specific objective, subject to one or more constraints corresponding to the site-specific power plan,
wherein the site-specific power plan specifies a target range of a rate of change of total power consumption by the plurality of computing devices,
wherein the computational parameters are determined subject to the target range, and
wherein a computational parameter of the first group of computing devices is different from a corresponding computational parameter of the second group of computing devices; and
controlling the plurality of computing devices to perform the common type of computation using the determined computational parameters.

2. The method of claim 1, wherein the site-specific power plan specifies at least one of a maximum total power consumption by the plurality of computing devices or a minimum total power consumption by the plurality of computing devices, and
wherein the computational parameters are determined subject to the at least one of the maximum total power consumption or the minimum total power consumption.

3. The method of claim 1, wherein the computational parameters comprise a power mode.

4. The method of claim 1, wherein the computational parameters comprise at least one of a supply voltage or a clock frequency.

5. The method of claim 1, comprising:
receiving an instruction from a utility provider or a regulator, the instruction indicating at least one of a maximum total power consumption by the plurality of computing devices, a minimum total power consumption by the plurality of computing devices, or a maximum rate of increase in total power consumption by the plurality of computing devices;
in response to the instruction, determining a new site-specific power plan for the first site; and
determining new computational parameters of the plurality of computing devices based on the first group-specific objective and the second group-specific objective, subject to constraint by the new site-specific power plan.

6. The method of claim 1, wherein controlling the plurality of computing devices comprises:
determining to switch the plurality of computing devices from a first state in which the plurality of computing devices do not perform the common type of computation to a second state in which the plurality of computing devices perform the common type of computation;
determining at least one of an order or a timing with which to switch the plurality computing devices from the first state to the second state based on the first group-specific objective and the second group-specific objective, subject to constraint by the site-specific power plan; and
causing the plurality of computing devices to switch from the first state to the second state in accordance with the at least one of the order or the timing.

7. The method of claim 1, wherein the computational parameters result in a power consumption of the first group of computing devices changing at a first rate that is different from a second rate with which a power consumption of the second group of computing devices changes, and
wherein a difference between the first rate and the second rate is based on a difference between a first weighting of computation rate in the first group-specific objective and a second weighting of computation rate in the second group-specific objective.

8. The method of claim 1, wherein the common type of computation comprises a hash computation or a machine learning computation.

9. A method comprising:
presenting, in a user interface, a first display indicating membership of a plurality of computing devices in a first site,
wherein each of the plurality of computing devices comprises a plurality of integrated circuit (IC) chips configured to perform a common type of computation in parallel with one another,
wherein the plurality of computing devices of the first site are configured to receive power through a common grid-facing meter;
receiving, in the user interface, user inputs indicating a division of the plurality of computing devices into a first group of computing devices and a second group of computing devices,
receiving, in the user interface, a first user input indicative of a site-specific power plan for the first site, wherein the site-specific power plan comprises a constraint applicable to the plurality of computing devices;
receiving, in the user interface, a second user input indicative of a first group-specific objective for the first group of computing devices;
receiving, in the user interface, a third user input indicative of a second group-specific objective for the second group of computing devices, wherein the first group-specific objective is different from the second group-specific objective;

controlling the plurality of computing devices to perform the common type of computation in parallel with one another, based on the site-specific power plan, the first group-specific objective, and the second group-specific objective;

receiving, through the user interface, a fourth user input indicating that a first computing device is re-assigned from the first group to the second group; and based on the re-assignment, determining updated computational parameters based on which the plurality of computing devices are controlled.

10. The method of claim 9, wherein the first user input indicates a utility provider or a regulator with which the first site is associated, and wherein the method comprises:

receiving dynamic data from the utility provider or the regulator;

determining, based on the dynamic data, an updated constraint comprising at least one of: a maximum total power consumption by the plurality of computing devices, a minimum total power consumption by the plurality of computing devices, or a maximum rate of increase in total power consumption by the plurality of computing devices; and controlling the plurality of computing devices subject to the updated constraint.

11. The method of claim 9, wherein the second user input comprises a function to be optimized for the first group-specific objective, and wherein controlling the plurality of computing devices comprises controlling the first group of computing devices based on optimization of the function.

12. The method of claim 9, wherein the site-specific power plan specifies a target range of a rate of change of total power consumption by the plurality of computing devices, and wherein controlling the plurality of computing devices comprises controlling the plurality of computing devices subject to the target range.

13. The method of claim 9, wherein controlling the plurality of computing devices comprises configuring at least one of a power mode, a supply voltage, or a clock frequency of the plurality of computing devices.

14. The method of claim 9, wherein the common type of computation comprises a hash computation or a machine learning computation.

15. A method, comprising:

determining a site-specific power plan for a first site, wherein the first site comprises a plurality of computing devices, wherein each of the plurality of computing devices comprises a plurality of integrated circuit (IC) chips configured to perform a common type of computation in parallel with one another, wherein the plurality of computing devices are configured to receive power through a common grid-facing meter, and wherein the site-specific power plan is determined based on real-time data characterizing an electrical grid from which the common grid-facing meter receives electricity;

obtaining a first group-specific objective for a first group of computing devices of the plurality of computing devices, and obtaining a second group-specific objective for a second group of computing devices of the plurality of computing devices, wherein the first group-specific objective is different from the second group-specific objective;

determining computational parameters of the plurality of computing devices based on the first group-specific objective and the second group-specific objective, subject to one or more constraints corresponding to the site-specific power plan, wherein a computational parameter of the first group of computing devices is different from a corresponding computational parameter of the second group of computing devices; and controlling the plurality of computing devices to perform the common type of computation using the determined computational parameters.

16. The method of claim 15, wherein the computational parameters comprise at least one of a power mode, a supply voltage, or a clock frequency.

17. The method of claim 15, comprising:

receiving an instruction from a utility provider or a regulator, the instruction indicating at least one of a maximum total power consumption by the plurality of computing devices, a minimum total power consumption by the plurality of computing devices, or a maximum rate of increase in total power consumption by the plurality of computing devices;

in response to the instruction, determining a new site-specific power plan for the first site; and determining new computational parameters of the plurality of computing devices based on the first group-specific objective and the second group-specific objective, subject to constraint by the new site-specific power plan.

18. The method of claim 15, wherein controlling the plurality of computing devices comprises:

determining to switch the plurality of computing devices from a first state in which the plurality of computing devices do not perform the common type of computation to a second state in which the plurality of computing devices perform the common type of computation;

determining at least one of an order or a timing with which to switch the plurality computing devices from the first state to the second state based on the first group-specific objective and the second group-specific objective, subject to constraint by the site-specific power plan; and causing the plurality of computing devices to switch from the first state to the second state in accordance with the at least one of the order or the timing.

19. The method of claim 15, wherein the computational parameters result in a power consumption of the first group of computing devices changing at a first rate that is different from a second rate with which a power consumption of the second group of computing devices changes, and wherein a difference between the first rate and the second rate is based on a difference between a first weighting of computation rate in the first group-specific objective and a second weighting of computation rate in the second group-specific objective.

20. A method comprising:

presenting, in a user interface, a first display indicating membership of a plurality of computing devices in a first site, wherein each of the plurality of computing devices comprises a plurality of integrated circuit (IC) chips configured to perform a common type of computation in parallel with one another, wherein the plurality of computing devices of the first site are configured to receive power through a common grid-facing meter;

receiving, in the user interface, user inputs indicating a division of the plurality of computing devices into a first group of computing devices and a second group of computing devices, receiving, in the user interface, a first user input indicative of a site-specific power plan for the first site, wherein the site-specific power plan comprises a constraint applicable to the plurality of computing devices;

receiving, in the user interface, a second user input indicative of a first group-specific objective for the first group of computing devices, wherein the second user input comprises a function to be optimized for the first group-specific objective;

receiving, in the user interface, a third user input indicative of a second group-specific objective for the second group of computing devices, wherein the first group-specific objective is different from the second group-specific objective; and controlling the plurality of computing devices to perform the common type of computation in parallel with one another, based on the site-specific power plan, the first group-specific objective, and the second group-specific objective, wherein controlling the plurality of computing devices comprises controlling the first group of computing devices based on optimization of the function.

21. The method of claim 20, wherein controlling the plurality of computing devices comprises configuring at least one of a power mode, a supply voltage, or a clock frequency of the plurality of computing devices.

22. The method of claim 20, wherein the first user input indicates a utility provider or a regulator with which the first site is associated, and wherein the method comprises:

receiving dynamic data from the utility provider or the regulator;

determining, based on the dynamic data, an updated constraint comprising at least one of:

a maximum total power consumption by the plurality of computing devices, a minimum total power consumption by the plurality of computing devices, or a maximum rate of increase in total power consumption by the plurality of computing devices; and controlling the plurality of computing devices subject to the updated constraint.

23. The method of claim 20, wherein the site-specific power plan specifies a target range of a rate of change of total power consumption by the plurality of computing devices, and wherein controlling the plurality of computing devices comprises controlling the plurality of computing devices subject to the target range.

* * * * *